(12) United States Patent
Shin et al.

(10) Patent No.: US 10,595,109 B2
(45) Date of Patent: Mar. 17, 2020

(54) DISPLAY APPARATUS AND COMPUTING APPARATUS INCLUDING THE SAME

(71) Applicant: LG Display Co., Ltd., Seoul (KR)

(72) Inventors: JaeMin Shin, Daegu (KR); ChanHeon Lee, Daegu (KR); Minji Kim, Ulsan (KR); Wangeon Sim, Gyeongsangbuk-do (KR); HyunWook Jang, Daegu (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 16/127,660

(22) Filed: Sep. 11, 2018

(65) Prior Publication Data
US 2019/0182573 A1  Jun. 13, 2019

(30) Foreign Application Priority Data
Dec. 13, 2017 (KR) .................. 10-2017-0171211

(51) Int. Cl.
- H04R 1/02 (2006.01)
- H04R 17/00 (2006.01)
- G06F 1/16 (2006.01)
- H04R 7/04 (2006.01)

(52) U.S. Cl.
CPC ........... *H04R 1/028* (2013.01); *G06F 1/1605* (2013.01); *G06F 1/1616* (2013.01); *G06F 1/1626* (2013.01); *G06F 1/1688* (2013.01); *H04R 7/045* (2013.01); *H04R 17/00* (2013.01); *H04R 2499/15* (2013.01)

(58) Field of Classification Search
None
See application file for complete search history.

(56) References Cited

U.S. PATENT DOCUMENTS

| | | | |
|---|---|---|---|
| 6,324,052 B1 | 11/2001 | Azima et al. | |
| 2004/0246109 A1 | 12/2004 | Suzuki et al. | |
| 2006/0078138 A1* | 4/2006 | Wada | H04R 1/028 381/306 |
| 2007/0132911 A1 | 6/2007 | Fujiwara et al. | |
| 2014/0247959 A1 | 9/2014 | Yamanaka et al. | |
| 2015/0341714 A1* | 11/2015 | Ahn | G06F 1/1688 381/333 |
| 2015/0350775 A1* | 12/2015 | Behles | H04R 3/002 381/354 |
| 2015/0373441 A1* | 12/2015 | Behles | H01L 41/0973 381/333 |
| 2017/0105294 A1* | 4/2017 | Shimoda | H04M 1/02 |

OTHER PUBLICATIONS

Extended European Search Report dated Apr. 2, 2019, in corresponding European Patent Application No. 18193433.2.

* cited by examiner

*Primary Examiner* — James K Mooney
(74) *Attorney, Agent, or Firm* — Morgan, Lewis & Bockius LLP

(57) ABSTRACT

Provided are a display apparatus and a computing apparatus including the same. A display apparatus includes: a display module including a display panel configured to display an image, a vibration plate on the display module, a first air gap between the vibration plate and the rear surface of the display module, a vibration module on the vibration plate, and a system rear cover on the vibration plate, a second air gap between the system rear cover and the vibration plate, wherein the vibration plate includes a communication part configured to allow air to flow between the first air gap and the second air gap.

27 Claims, 11 Drawing Sheets

DISPLAY APPARATUS AND COMPUTING APPARATUS INCLUDING THE SAME

CROSS-REFERENCE TO RELATED APPLICATION(S)

This application claims the benefit of and priority to Korean Patent Application No. 10-2017-0171211, filed on Dec. 13, 2017, the entirety of which is hereby incorporated by reference.

BACKGROUND

1. Technical Field

The present disclosure relates to a display apparatus and a computing apparatus including the same.

2. Discussion of the Related Art

In general, display apparatuses can be equipped in home appliances or electronic devices, such as televisions (TVs), monitors, desktop personal computers (PCs), notebook computers, smartphones, tablet computers, electronic organizers, electronic pads, wearable devices, watch phones, portable information devices, navigation devices, and automotive control display apparatuses, and are used as a screen for displaying an image. Generally, display apparatuses include a display panel for displaying an image and a sound device for outputting a sound associated with the image.

However, in display apparatuses, such as TVs and monitors, because a sound output from a sound device travels to a region behind or under a display panel, sound quality may be degraded due to interference between sounds reflected from a wall and the ground. As such, a viewer's immersion experience may be reduced.

Moreover, in sound devices (e.g., speakers) included in general computing devices, such as notebook computers or tablet computers, it is difficult to realize high sound quality. For example, a low band base sound is not sufficient. Also, as system bodies are made lighter and smaller, it is difficult to achieve a low-pitched sound of about 1 kHz or less, and a high-pitched sound of about 4 kHz or more. Furthermore, sound devices of general computing apparatuses are often disposed on a lower side of a keyboard and a floor, a left side surface, and a right side surface of a body, and are spaced apart from a screen. As such, a viewer's immersion experience may be reduced due to a sense of difference (or mismatch) caused by a distance difference between an image and a sound. In other words, in speakers of general computing devices, because an output direction of a sound is not a direction toward the ears of a viewer, a sound having a middle-high-pitched sound band of about 2 kHz or more having strong linearity is not directly transferred to a viewer, and is lost or distorted.

SUMMARY

Accordingly, the present disclosure is directed to a display apparatus and a computing apparatus including the same that substantially obviate one or more of the issues due to limitations and disadvantages of the related art.

An aspect of the present disclosure is to provide a display apparatus and a computing apparatus including the same, which output a sound using a vibration of a display module.

Another aspect of the present disclosure is to provide a display apparatus and a computing apparatus including the same, in which a sound characteristic of a low-pitched sound band is improved.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts as embodied and broadly described, there is provided a display apparatus, including: a display module including a display panel configured to display an image, a vibration plate on the display module, a first air gap between the vibration plate and the rear surface of the display module, a vibration module on the vibration plate, and a system rear cover on the vibration plate, a second air gap between the system rear cover and the vibration plate, wherein the vibration plate includes a communication part configured to allow air to flow between the first air gap and the second air gap.

In another aspect, there is provided a computing apparatus, including: a system body, a display apparatus including: a display module including a display panel configured to display an image, a vibration plate on a rear surface of the display module, a first air gap between the vibration plate and the rear surface of the display module, a vibration module on the vibration plate, and a system rear cover on a rear surface of the vibration plate, a second air gap between the system rear cover and the rear surface of the vibration plate, wherein the vibration plate includes a communication part configured to allow air to flow between the first air gap and the second air gap, and a hinge part between the system body and the display apparatus, the hinge part being configured to rotatably support the display apparatus.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

Figure 1:
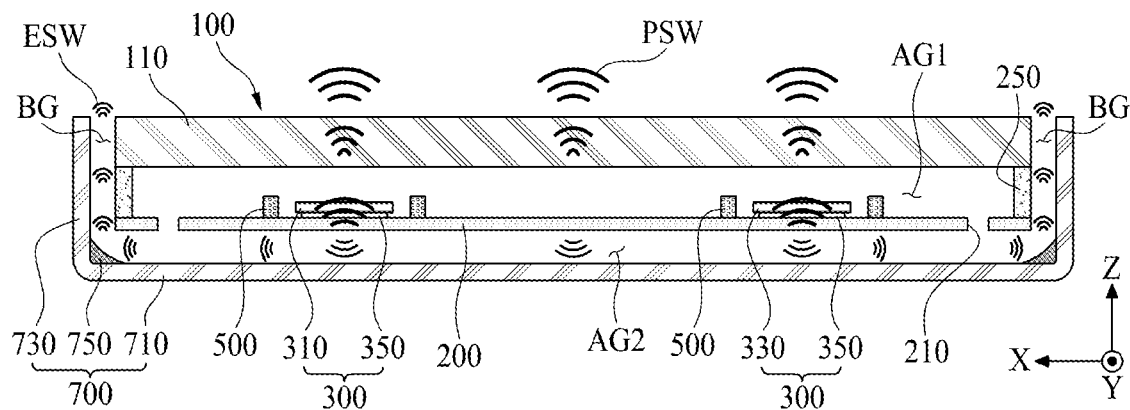
FIG. 1 illustrates a display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range. In describing a position relationship, when a position relation between two parts is described as, for example, "on," "over," "under," or "next," one or more other parts may be disposed between the two parts unless a more limiting term, such as "just" or "direct(ly)," is used.

In describing a time relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, embodiments of a display apparatus and a computing apparatus including the same according to the present disclosure will be described in detail with reference to the accompanying drawings. In adding reference numerals to elements of each of the drawings, although the same elements are illustrated in other drawings, like reference numerals may refer to like elements. In description below, when the detailed description of the relevant known function or configuration is determined to unnecessarily obscure the important point of the present disclosure, the detailed description will be omitted.

FIG. 1 illustrates a display apparatus according to an embodiment of the present disclosure.

With reference to FIG. 1, the display apparatus according to an embodiment of the present disclosure may include a display module 100, a vibration plate 200, a vibration module 300, and a system rear cover 700. The display module 100 may include a display panel 110, which may display an image. The display module 100 may include a first rear region and a second rear region, which may be provided in parallel with a rear middle portion therebetween. The display panel 110 may be any display panel, such as a liquid crystal display panel, a light-emitting display panel, an electrophoresis display panel, a micro light-emitting diode display panel, an electro wetting display panel, and a quantum dot light-emitting display panel. Hereinafter, for convenience of explanation, a liquid crystal display apparatus having a liquid crystal display panel and a light-emitting display apparatus having a light-emitting display panel will be described as an example, but embodiments of the present disclosure are not limited thereto.

The vibration plate 200 may be connected to the display module 100. The vibration plate 200 may face a rear surface of the display module 100. The display module 100 may have a front surface from which the display panel 110 may emit light or display an image. The rear surface of the display module 100 may be opposite to the front surface of the display module 100. The vibration plate 200 according to an embodiment of the present disclosure may include one or more of, for example, an aluminum (Al) material, a magnesium (Mg) material, an Al alloy material, a Mg alloy material, and a Mg-lithium (Li) alloy material. For example, the Mg alloy material may include at least one of Al, zinc (Zn), and manganese (Mn). The Mg alloy material may be a lightest material of metal materials of a mechanism structure, may have relatively high non-rigidity (intensity/specific gravity) and relatively high vibration damping ability (ability to absorb and progressively reduce vibration), and may have good dimension stability with respect to a variation of a temperature and the elapse of time. Embodiments are not limited to these examples.

When the vibration plate 200 according to an embodiment of the present disclosure is formed of one of an Al material, a Mg material, an Al alloy material, a Mg alloy material, and a Mg—Li alloy material, a fine sound may be realized due to a reactivity (a response time) of a fast sound based on a low density, and a sound having a whole sound band, including a low-pitched sound band to a high-pitched sound band, may be realized based on a fast sound speed due to high non-rigidity. Also, because internal loss is large due to high vibration damping ability, undesired vibration may not occur. Thus, a residual sound and a reflected sound or a resonance sound may be suppressed, thereby enabling an original sound to be reproduced. Also, the vibration plate 200 may have high elasticity. Thus, a high-pitched sound of about 40 kHz or more may be realized.

The vibration plate 200 according to an embodiment of the present disclosure may be on the rear surface of the display module 100, with a first air gap AG1 therebetween using a plate securing member 250. The vibration plate 200 may cover the rear surface of the display module 100, and may be spaced apart from the rear surface of the display module 100. For example, the vibration plate 200 may have a thickness of about 0.1 mm to 2.0 mm, e.g., for enhancing a sound having a high-pitched sound band. If the thickness of the vibration plate 200 is less than 0.1 mm, it may be difficult to maintain flatness of sound, and the vibration plate 200 may be torn or damaged when vibrating. On the other hand, if the thickness of the vibration plate 200 is more than 2.0 mm, the vibration plate 200 may be suitable for realizing a sound having a low-pitched sound band, rather than a sound having a high-pitched sound band.

The vibration plate 200 according to an embodiment of the present disclosure may include a communication part 210 between the plate securing member 250 and the vibration module 300. The communication part 210 may vertically pass through the vibration plate 200 along a thickness direction Z of the display module 100. The thickness direction may be defined as a direction that is perpendicular to the front surface or the rear surface of the display module 110. The communication part 210 according to an embodiment of the present disclosure may be in a periphery of the vibration plate 200 adjacent to the plate securing member 250. The communication part 210 may communicate the first air gap AG1 on a front surface of the vibration plate 200 with a second air gap AG2 on a rear surface of the vibration plate 210, thereby enabling air to smoothly flow between the first and second air gaps AG1 and AG2 when the vibration plate 200 vibrates (or shakes). In other words, the communication part 210 may allow air to flow between the first air gap AG1 and the second air gap AG2. Therefore, the vibration plate 200 may vibrate stably. Thus, a sound pressure characteristic and a frequency characteristic of a low-pitched sound band based on the vibration of the vibration plate 200 may be enhanced. For example, the low-pitched sound band frequency may be about 800 Hz or less, but embodiments are not limited thereto. The front surface of the vibration plate 200 may face the rear surface of the display module 100.

The plate securing member 250 may be between the periphery of the vibration plate 200 and the rear surface of the display module 100. Thus, the vibration plate 200 may be fixed to the rear surface of the display module 100, and the first air gap AG1 may be between the rear surface of the display module 100 and the vibration plate 200. The first air gap AG1 may be a vibration space that may enable the vibration plate 200 to vibrate, and may enable the display module 100 to vibrate based on the vibration of the vibration plate 200.

The plate securing member 250 according to an embodiment of the present disclosure may include a double-sided tape and/or an adhesive resin. The double-sided tape may include a pad or a foam pad having a certain height (or a certain thickness). The adhesive resin may include an acryl-based material or an urethane-based material. For example, to reduce or minimize a vibration of the vibration plate 200 directly transferred to the display module 100, the adhesive resin may include the urethane-based material having a relatively higher ductile characteristic than the acryl-based material. However, embodiments are not limited to these examples.

The vibration module 300 may be on the vibration plate 200, and may vibrate according to a sound driving signal (or a vibration driving signal) input thereto to vibrate the vibration plate 200. The vibration module 300 according to an embodiment of the present disclosure may include a first vibration element 310 and a second vibration element 330.

The first vibration element 310 may be attached to one side or surface of the vibration plate 200 by an element adhesive member 350. The second vibration element 330 may be attached to the other side or surface of the vibration plate 200 by the element adhesive member 350. The element adhesive member 350 may include a double-sided tape or a naturally curable adhesive, but are not limited thereto. For example, the element adhesive member 350 may include a thermocurable adhesive or a photocurable adhesive, and a characteristic of the vibration element 310 may be reduced by heat used in a curing process of curing the element adhesive member 350.

Each of the first vibration element 310 and the second vibration element 330, according to an embodiment of the present disclosure, may be attached to a front surface of the vibration plate 200 to face the rear surface of the display module 100 with the first air gap AG1 therebetween. For example, to reduce or prevent the rear surface of the display module 100 from physically contacting the first and second vibration elements 310 and 330, which may vibrate according to the sound driving signal input thereto, the first and second vibration elements 310 and 330 may be spaced apart from the rear surface of the display module 100 by a predetermined distance, and a distance between the display module 100 and each of the first and second vibration elements 310 and 330 may be adjusted based on a height (or a thickness) of the plate securing member 250. Therefore, the plate securing member 250 may be configured to have a height (or a thickness), which may be relatively greater than a distance between the front surface of the vibration plate 200 and a front surface of each of the first and second vibration elements 310 and 330, with respect to the thickness direction Z of the display module 100. Therefore, embodiments of the present disclosure may reduce or prevent the first and second vibration elements 310 and 330 from being damaged by a direct physical contact between the display module 100 and each of the first and second vibration elements 310 and 330. Alternatively, each of the first and second vibration elements 310 and 330, according to an embodiment of the present disclosure, may be attached to a rear surface of the vibration plate 200 to face the system rear cover 700.

Each of the first and second vibration elements 310 and 330 may include a piezoelectric material layer having a piezoelectric effect, a first electrode on a front surface of the piezoelectric material layer, and a second electrode on a rear surface of the piezoelectric material layer. The piezoelectric material layer may include a piezoelectric material, which may vibrate with an electric field. The piezoelectric material may have a characteristic in which, as pressure is applied to or twisting occurs in a crystalline structure due to an external force, a potential difference may be caused by dielectric polarization based on a relative position change of a positive (+) ion and a negative (−) ion, and vibration may occur due to an electric field based on an applied voltage.

The piezoelectric material layer according to an embodiment of the present disclosure may include, for example, a piezoelectric material of a polymer material, a piezoelectric material of a thin film material, a piezoelectric material of a composite material, a piezoelectric material of a single crystalline ceramic, and/or a piezoelectric material of a polycrystalline ceramic. Examples of the piezoelectric material of polymer material may include polyvinylidene fluoride (PVDF), polyvinylidene fluoride trifluoroethylene P(VDF-TrFe), and P(VDFTeFE). Examples of the piezoelectric material of thin film material according to an embodiment of the present disclosure may include zinc oxide (ZnO), cadmium sulfide (CdS), and aluminum nitride (AlN). Examples of the piezoelectric material of composite material may include PZT-PVDF, PZT-silicon rubber, PZT-epoxy, PZT-foam polymer, and PZT-foam urethane. Examples of the piezoelectric material of single crystalline ceramic according to an embodiment of the present disclosure may include aluminum phosphate (e.g., berlinite, $\alpha$-AlPO$_4$), silicon dioxide (e.g., $\alpha$-SiO$_2$), lithium niobate(LiNbO$_3$), terbium molybdate (Tb$_2$(MoO$_4$)$_3$), lithium tetraborate (Li$_2$B$_4$O$_7$), and ZnO. Examples of the piezoelectric material of a polycrystalline ceramic according to an embodiment of the present disclosure may include a PZT-based ceramic piezoelectric material, a PT-based ceramic piezoelectric material, a PZT-complex perovskite-based ceramic piezoelectric material, and barium titanate (BaTiO$_3$). Embodiments are not limited to these example materials.

The first electrode and the second electrode according to an embodiment of the present disclosure may overlap each other with the piezoelectric material layer therebetween. The first electrode and the second electrode may each include an opaque metal material, which may be relatively low in resistance, and may have a good heat dissipation characteristic, but embodiments are not limited thereto. In other embodiments, the first electrode and the second electrode may each include a transparent conductive material and/or a conductive polymer material.

Each of the first vibration element 310 and the second vibration element 330 may have a relatively small area. Thus, each of the first vibration element 310 and the second vibration element 330 may have a good sound characteristic of a high-pitched sound band, thereby enhancing a sound pressure level of a high-pitched sound band and a frequency characteristic of the high-pitched sound band of a sound generated based on a vibration of the display module 100. For example, a high-pitched sound band frequency may be about 3 kHz or more, but embodiments are not limited thereto.

The system rear cover 700 may accommodate the display module 100 and the vibration plate 200 connected to the vibration module 300. The system rear cover 700 according to an embodiment of the present disclosure may include a bottom structure 710 and a sidewall structure 730.

The bottom structure 710, e.g., an outermost rear structure located on a rear surface of the display apparatus, may support a rear periphery of the display module 100, and may cover the rear surface of the vibration plate 200 with the second air gap AG2 therebetween. The sidewall structure 730, e.g., an outermost side structure located on a side surface of the display apparatus, may be provided in a periphery of the bottom structure 710, and may cover side surfaces of the display module 100 and side surfaces of the vibration plate 200 with a border gap BG therebetween.

The system rear cover 700 according to an embodiment of the present disclosure may further include a rear sound guide member 750. The rear sound guide member 750 may protrude from a corner of the bottom structure 710 and the sidewall structure 730, or may be installed in the corner of the bottom structure 710 and the sidewall structure 730. The rear sound guide member 750 according to an embodiment of the present disclosure may include an inclined surface or a curved surface facing the second air gap AG2 and the border gap BG. The rear sound guide member 750 may guide a traveling path of a rear sound, traveling via the second air gap AG2, to the border gap BG (for example, a direction toward a front surface of the display panel 110), thereby reducing or preventing the rear sound from being re-reflected to the second air gap AG2 by the sidewall structure 730, or reducing or minimizing the re-reflection of the rear sound.

The display apparatus according to an embodiment of the present disclosure may further include a buffering member 500. The buffering member 500 may be installed in or on the vibration plate 200, and may be located near the vibration module 300. The buffering member 500 according to an embodiment of the present disclosure may include a foam pad. The buffering member 500 may reduce or prevent a physical contact between the vibration module 300 and the display module 100, thereby reducing or preventing the vibration module 300 from being damaged or broken due to the physical contact between the vibration module 300 and the display module 100. As such, an upper portion of the buffering member 500 may be located between an upper surface of the vibration module 300 and the rear surface of the display module 100. For example, a height of the buffering member 500 may be adjusted higher than that of the vibration module 300 with respect to the front surface of the vibration plate 200.

The buffering member 500 according to an embodiment of the present disclosure may have a polygonal shape or a circular shape, which may surround the vibration module 300 (for example, each of the first vibration element 310 and the second vibration element 330), but embodiments are not limited thereto. For example, the buffering member 500 may have a line or dot shape, e.g., for reducing or preventing a physical contact between the display module 100 and each of the first vibration element 310 and the second vibration element 330.

The display apparatus according to an embodiment of the present disclosure may include the vibration plate 200, which may vibrate along with a vibration of the vibration module 300 based on the sound driving signal input thereto, and the display module 100, which may vibrate based on the vibration of the vibration plate 200. Thus, the vibration plate 200 may output a panel vibration sound, generated based on the vibration of the display module 100, to a front portion of the display panel 110. Simultaneously, a plate vibration sound generated based on the vibration of the vibration plate 200 may be output to a front portion of the display panel 100 through the second air gap AG2 and the border gap BG. For example, in the display apparatus according to an embodiment of the present disclosure, when the vibration module 300 vibrates according to the sound driving signal, a sound pressure may be generated in each of the first and second air gaps AG1 and AG2 by the vibration of the vibration plate 200 based on the vibration of the vibration module 300. Also, the display module 100 may vibrate based on the sound pressure generated in the first air gap AG1 to generate a panel vibration sound, and the panel vibration sound may be directly output as a panel sound wave PSW to a front portion of the display panel 110. Also, a vibration of the vibration plate 200 caused by the sound pressure generated in the second air gap AG2 may be directly output as an edge sound wave ESW to the front portion of the display panel 110 through the second air gap AG2 and the border gap BG. Also, the bottom structure 710 of the system rear cover may vibrate based on the sound pressure generated in the second air gap AG2 to generate a cover vibration sound, and the cover vibration sound may be output as a rear sound to a rear portion of the system rear cover. Therefore, in the display apparatus according to an embodiment of the present disclosure, when the communication part 210 is in the vibration plate 200, an air gap, which may be a space enabling the display module 100 and the vibration plate 200 to vibrate may extend from the first air gap AG1 between the display module 100 and the vibration plate 200 to the second air gap AG2 between the vibration plate 200 and the system rear cover 700. Thus, the vibration plate 200 may vibrate stably, thereby improving a sound pressure level and a sound quality of a low-pitched sound band.

Therefore, the display apparatus according to an embodiment of the present disclosure may output the panel sound wave PSW generated based on the vibration of the display panel 110 and the edge sound wave ESW, which may be generated based on a vibration of the vibration plate, and may be output to a front portion of the display panel 110 through the border gap BG, to the front portion of the display panel 110, instead of a lower or rear portion of the display panel 110. Thus, sound may be accurately transferred, thereby improving sound quality to increase a viewer's immersion experience. In the display apparatus according to an embodiment of the present disclosure, when the display panel 110 vibrates based on a vibration of the vibration plate 200, a sound having high sound quality and a broad sound band may be output, and a sound field that fully fills a whole screen may be realized, whereby a viewer's immersion experience may be enhanced due to harmony (or match) between an image and sound. For example, a sound having a middle-high-pitched sound band of about 2 kHz to 20 kHz may be strong in linearity. Thus, even when the sound should be output toward ears of a viewer, the sound may be transferred to the viewer without being lost or distorted. However, a sound having a middle-high-pitched sound band, which may be output from a lower speaker and/or a rear speaker equipped in a related art display apparatus, may not be normally transferred to a viewer due to an output direction thereof. On the other hand, in the display apparatus according to an embodiment of the present disclosure, when the sound waves PSW and ESW output from the display panel 110 travel toward ears of a viewer, a sound having a middle-high-pitched sound band may be directly transferred to the viewer without being lost or distorted. Thus, a sound substantially similar to an original sound may be provided to the viewer.

Figure 2:
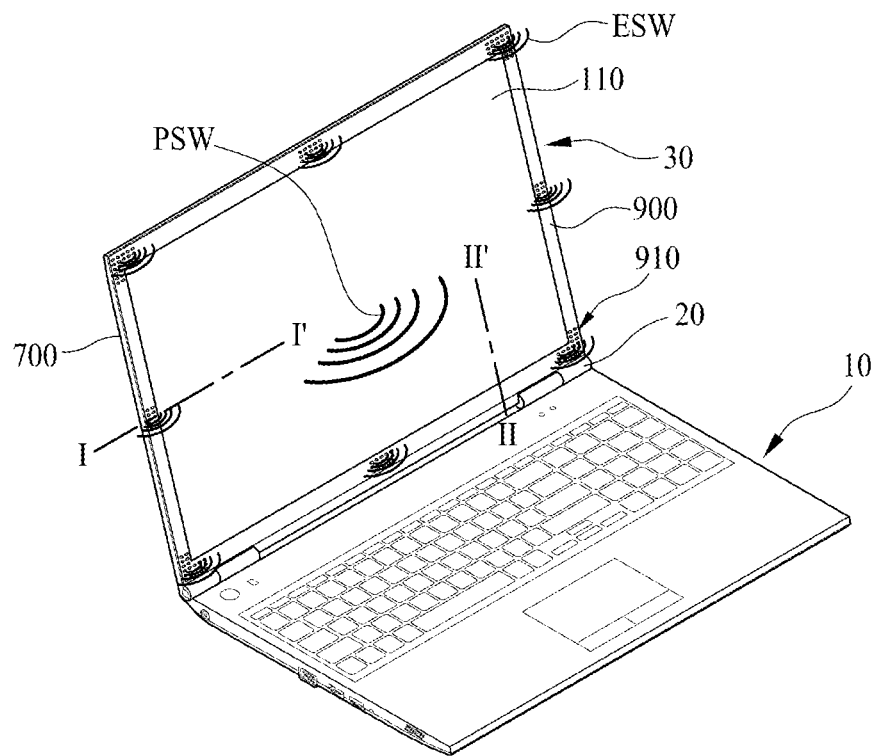
FIG. 2 illustrates a computing apparatus according to an embodiment of the present disclosure.
Figure 3:
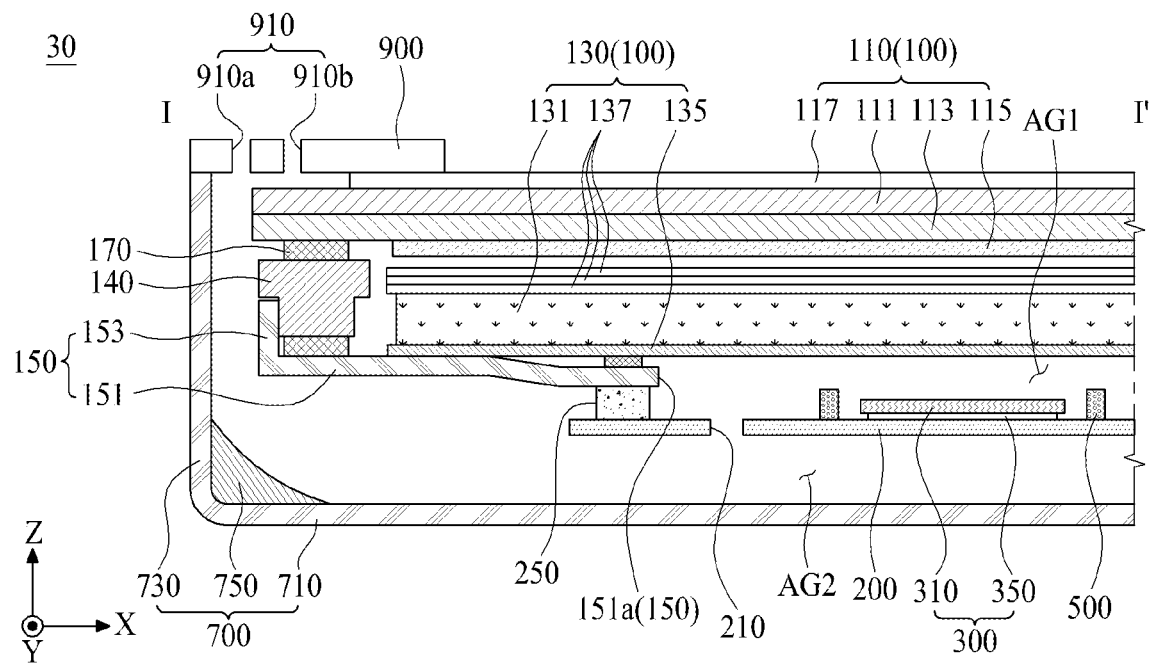
FIG. 3 is a cross-sectional view taken along line I-I' of FIG. 2.
Figure 4:
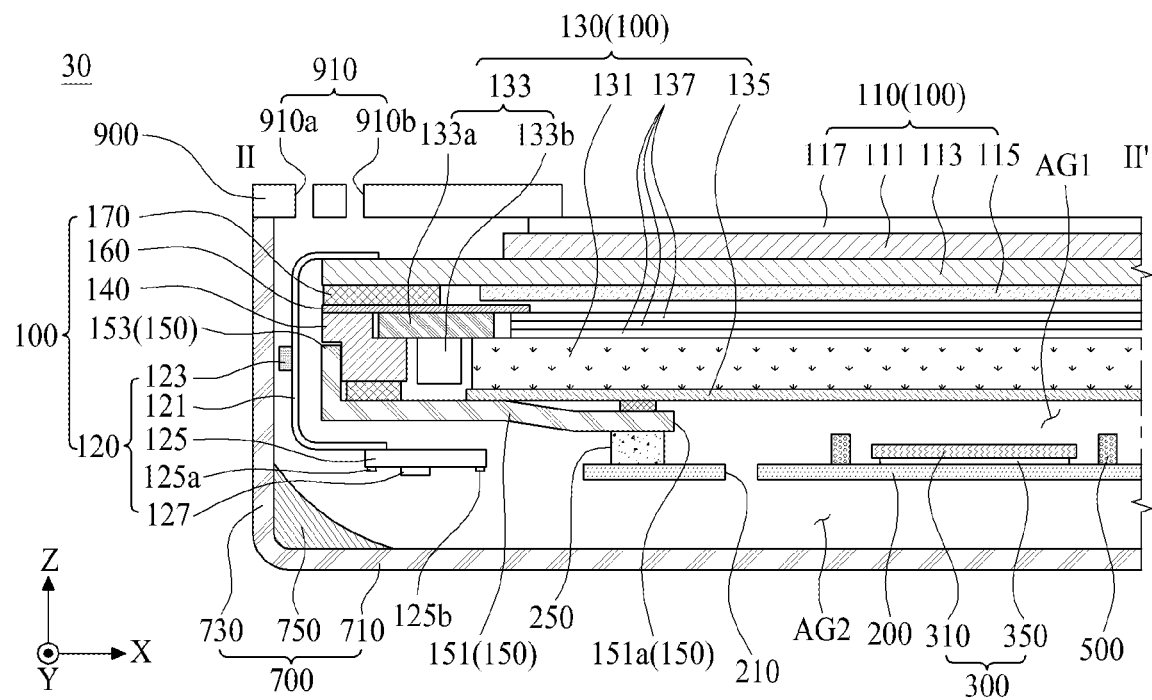
FIG. 4 is a cross-sectional view taken along line II-II' of FIG. 2.
Figure 5:
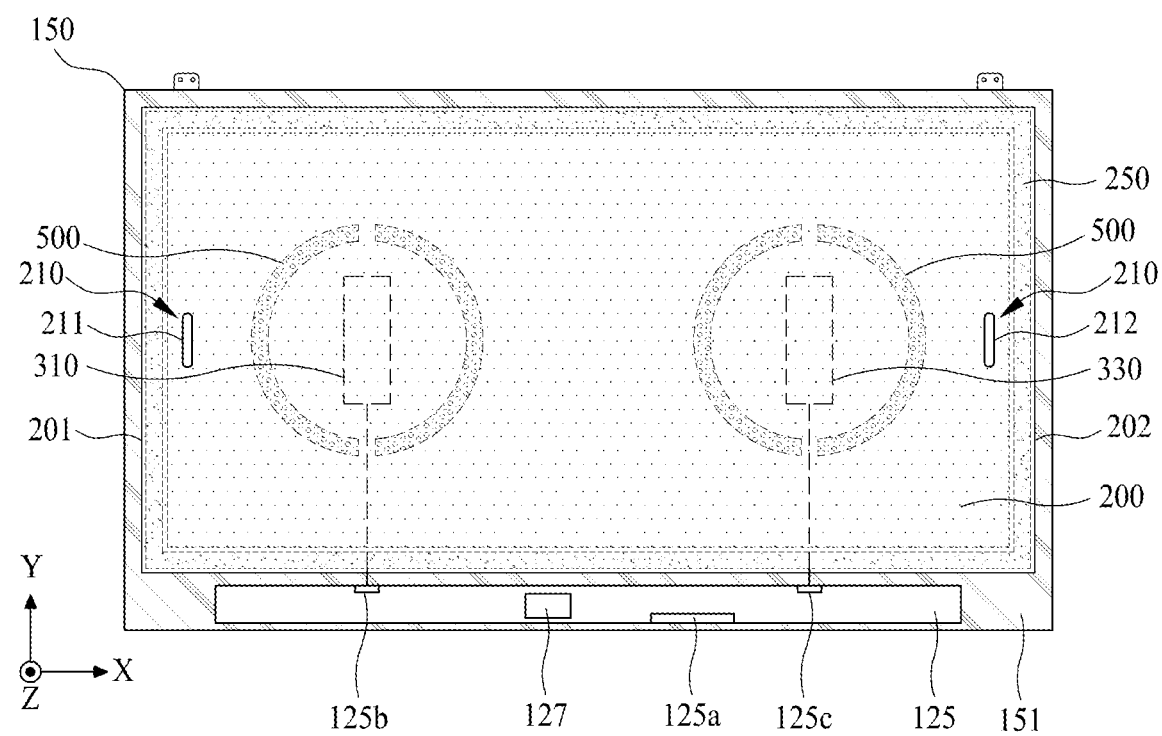
FIG. 5 illustrates a rear surface of a display module illustrated in FIG. 2.

FIG. 2 illustrates a computing apparatus according to an embodiment of the present disclosure. FIG. 3 is a cross-sectional view taken along line I-I' of FIG. 2. FIG. 4 is a cross-sectional view taken along line II-II' of FIG. 2. FIG. 5 illustrates a rear surface of a display module illustrated in FIG. 2.

With reference to the examples of FIGS. 2 to 5, the computing apparatus according to an embodiment of the present disclosure may include a system body 10, a hinge part 20, and a display apparatus 30 rotatably connected to the system body 10 through the hinge part 20. The system body 10 may include a main board, various circuits mounted on the main board, various storage mediums, peripheral devices, a keyboard, a power device, etc. The various circuits mounted on the main board may include, for example, a central control circuit for processing various information, an image processing circuit for processing data according to control by the central control circuit, a sound processing circuit for processing a sound according to control by the central control circuit, etc. The system body 10 may process various information, may generate video data and a sound signal, and may provide the display apparatus 30 with the processed information and the generated video data and sound signal.

The hinge part 20 may be installed between the system body 10 and the display apparatus 30, and may rotatably support a lower side of the display apparatus 30. The display apparatus 30 may be rotatably installed in the hinge part 20, and may cover an upper surface of the system body 10, or may be unfolded by a certain angle from an upper surface of the system body 10 with the hinge part 20 as a rotation shaft. The display apparatus 30 may display an image corresponding to video data provided from the system body 10, based on a timing control signal from the system body 10, and may output sound waves PSW and ESW corresponding to a sound signal from the system body 10. The sound signal may be synchronized with an image signal, or not.

The display apparatus 30 according to an embodiment of the present disclosure may include a display module 100, a vibration plate 200, a vibration module 300, a system rear cover 700, and a system front cover 900. The display module 100 may include a display panel 110, a panel driving circuit unit 120, a backlight unit 130, a panel guide 140, and a supporting cover 150. The display panel 110 may display an image using light irradiated from the backlight unit 130, and may include a lower substrate 113, an upper substrate 111, a lower polarization member 115, and an upper polarization member 117.

The lower substrate 113, e.g., a thin film transistor (TFT) array substrate, may include a pixel array including a plurality of pixels respectively in a plurality of pixel areas of a plurality of gate lines and a plurality of data lines. Each of the plurality of pixels may include a TFT connected to a gate line and a data line corresponding thereto, a pixel electrode connected to the TFT, and a common electrode adjacent to the pixel electrode and supplied with a common voltage. The lower substrate 113 may further include a pad part in a first periphery thereof and a gate driving circuit in a second periphery thereof.

The pad part may provide the pixel array and the gate driving circuit with a signal supplied from the outside. For example, the pad part may include a plurality of data pads connected to the plurality of data lines through a plurality of data link lines, and a plurality of gate input pads connected to the gate driving circuit via a gate control signal line.

The gate driving circuit may be embedded (or integrated) into the first periphery of the lower substrate 113 to be connected to the plurality of gate lines in a one-to-one relationship. For example, the gate driving circuit may be a shift register including a transistor, which may be formed through the same process as a process of forming a TFT in each of the pixel areas. Alternatively, the gate driving circuit may be in the panel driving circuit 120, without being embedded into the lower substrate 113.

The upper substrate 111, e.g., a color filter array substrate, may include a pixel defining pattern that may define an opening area overlapping each of the pixel areas provided on the lower substrate 113 and a color filter layer in the opening area. The upper substrate 111 may be attached to the lower substrate 113 with a liquid crystal layer therebetween, e.g., using a sealant. The liquid crystal layer may be between the lower substrate 113 and the upper substrate 111, and may include a liquid crystal including liquid crystal molecules having an alignment direction that may be changed based on an electric field generated from the common voltage and a data voltage applied to the pixel electrode in each of the plurality of pixels.

The lower polarization member 115 may be attached to a lower surface of the lower substrate 113, and may polarize light, e.g., irradiated from the backlight unit 130, to a first polarization axis to irradiate the polarized light onto the lower substrate 113. The upper polarization member 117 may be attached to an upper surface of the upper substrate 111, and may polarize light that may pass through the upper substrate 111, and may be output to an outside. The display panel 110 may drive the liquid crystal layer according to the electric field generated from the common voltage and the data voltage applied to each of the plurality of pixels, thereby displaying an image using light passing through the liquid crystal layer.

The panel driving circuit unit 120 may be connected to the pad part in the display panel 110, and may display an image, e.g., corresponding to the video data supplied from the system body 10, on each pixel. The panel driving circuit unit 120 according to an embodiment of the present disclosure may include a plurality of data flexible circuit films 121, a plurality of data driving integrated circuits (ICs) 123, a printed circuit board (PCB) 125, and a timing control circuit 127.

Each of the plurality of data flexible circuit films 121 may be attached to the pad part on the lower substrate 113 of the display panel 110, e.g., through a film attachment process. Each of the plurality of data flexible circuit films 121 may be bent to surround a side of each of the display panel 110 and the backlight unit 130, and may be connected to the PCB 125 at a rear surface of the supporting cover 150.

Each of the plurality of data driving ICs 123 may be individually mounted on a corresponding data flexible circuit film of the plurality of data flexible circuit films 121. Each of the plurality of data driving ICs 123 may receive pixel data and a data control signal supplied from the timing control circuit 127, may convert the pixel data into a pixel-based analog data signal according to the data control signal, and may supply the analog data signal to a corresponding data line. Alternatively, each of the plurality of data driving ICs 123 may be directly mounted on the first periphery of the lower substrate 113, and may be connected to a plurality of data lines. For example, the plurality of data flexible circuit films 121 may be omitted.

The PCB 125 may be connected to the plurality of data flexible circuit films 121. The PCB 125 may support the timing control circuit 127, and may transfer signals and power between elements of the panel driving circuit unit 120. The PCB 125 may include a user connector 125a, connected to the system body 10 through a cable, and first and second sound output connectors 125b and 125c connected to the vibration module 300.

The timing control circuit 127 may be mounted on the PCB 125, and may receive, e.g., through the user connector 125a of the PCB 125, the video data and a timing synchronization signal supplied from the system body 10. The timing control circuit 127 may align the video data according to a pixel arrangement structure to generate pixel data, based on the timing synchronization signal, and may supply the generated pixel data to the data driving ICs 123. Also, the timing control circuit 127 may generate the data control signal and a gate control signal, based on the timing synchronization signal. Thus, the timing control circuit 127 may control a driving timing of each of the plurality of data driving ICs 123 using the data control signal, and may control a driving timing of the gate driving circuit using the gate control signal.

Additionally, the panel driving circuit unit 120 may further include a plurality of gate flexible circuit films and a plurality of gate driving ICs. For example, the lower substrate 113 of the display panel 110 may further include a gate pad part, which may be in a third periphery thereof, and may include a plurality of gate pads connected to a plurality of gate lines through a plurality of gate link lines. Each of the plurality of gate flexible circuit films may be attached to the gate pad part on the lower substrate 113 of the display panel 110 through a film attachment process. Each of the plurality of gate flexible circuit films may be bent to a side surface of the display panel 110. Each of the plurality of gate driving ICs may be individually mounted on a corresponding gate flexible circuit film of the plurality of gate flexible circuit films. Each of the plurality of gate driving ICs may receive the gate control signal supplied from the timing control circuit 127 through a gate input pad, may generate a gate pulse according to the gate control signal, and may supply the gate pulse to the gate lines in a predetermined order. Alternatively, each of the plurality of gate driving ICs may be directly mounted on the third periphery of the lower substrate 113, e.g., through a chip bonding process, connected to a plurality of gate lines, and may be connected to the gate input pad on the lower substrate 113. For example, the plurality of gate flexible circuit films may be omitted.

The backlight unit 130 may be on a rear surface of the display panel 110, and may irradiate light onto the rear surface of the display panel 110. The backlight unit 130 according to an embodiment of the present disclosure may include a light guide plate 131, a light source unit 133, a reflective sheet 135, and an optical sheet unit 137.

The light guide plate 131 may overlap the display panel 110, and may include a light incident surface on one sidewall thereof. The light guide plate 131 may include a light-transmitting plastic or glass material, although embodiments are not limited thereto. The light guide plate 131 may transfer (or output) light, which may be incident through the light incident surface from the light source unit 133, to the display panel 110.

The light source unit 133 may irradiate light onto the light incident surface in the light guide plate 131. The light source unit 133 according to an embodiment of the present disclosure may include a light source PCB 133*a* and a plurality of light-emitting diodes (LEDs) 133*b*, which may be mounted on the light source PCB 133*a*, and may irradiate light onto the light incident surface of the light guide plate 131. The light source unit 133 may be covered by a light source housing. The light source housing may cover a front surface of the panel guide 140 and a periphery of the optical sheet until 137, which may be adjacent to each other with the light source unit 133 therebetween. The light source housing may cover an upper portion of the light source unit 133.

The reflective sheet 135 may cover a rear surface of the light guide plate 131. The reflective sheet 135 may reflect light, which may be incident from the light guide plate 131, toward the light guide plate 131 to reduce or minimize the loss of the light.

The optical sheet unit 137 may be on a front surface of the light guide plate 131, and may enhance a luminance characteristic of light output from the light guide plate 131. The optical sheet unit 137 according to an embodiment of the present disclosure may include a lower diffusive sheet, a lower prism sheet, and an upper prism sheet, but embodiments are not limited thereto. For example, the optical sheet unit 137 may include a stacked combination of one or more sheets among a diffusive sheet, a prism sheet, a dual brightness enhancement film (DBEF), and a lenticular sheet. As another example, the optical sheet unit 137 may include one composite sheet having a light diffusing function and a light collecting function. According to an embodiment of the present disclosure, when a sound is output based on a vibration of the display panel 110, which may respond to a vibration of the vibration plate 200, the loss of vibration in the vibration plate 200 may be reduced or minimized while the vibration is being transferred to the display panel 110. As such, the optical sheet unit according to an embodiment of the present disclosure may include one composite sheet having the light diffusing function and the light collecting function.

The panel guide 140 may be accommodated into the supporting cover 150, and may support the light source unit 133 and a periphery of a rear surface of the display panel 110. The panel guide 140 may include a panel supporting part, which may support the periphery of the rear surface of the display panel 110, and a cover connection part, which may be recessed from an outer surface of the panel supporting part.

The supporting cover 150 may support the panel guide 140. The supporting cover 150 may include a metal material, a plastic material, and/or the like. For example, to secure a rigidity of an LCD apparatus and to dissipate heat of the backlight unit 130, the supporting cover 150 may be formed of a metal material.

The supporting cover 150 according to an embodiment of the present disclosure may include a cover plate 151 and a cover sidewall 153. The cover plate 151 may cover a rear surface of the backlight unit 130. Thus, the cover plate 151 may support the reflective sheet 135 of the backlight unit 130 and the panel guide 140. For example, the panel guide 140 may be attached to the cover plate 151 by a double-sided tape.

The cover sidewall 153 may be vertically provided from a periphery of a front surface of the cover plate 151, and may surround an outer surface of the panel guide 140. For example, the cover sidewall 153 may be accommodated into the cover connection part in the panel guide 140.

The cover plate 151 may include a center opening 151*a*, which may overlap a portion other than a periphery of a rear surface of the display panel 110 or a periphery of a rear portion of the backlight unit 130. For example, the cover plate 151 may overlap the periphery of the rear surface of the display panel 110 or the periphery of the rear surface of the backlight unit 130. A weight of the cover plate 151 may be reduced in proportion to a size of the center opening 151*a*. For example, a double-sided tape may be between the cover plate 151 and the reflective sheet 135, but embodiments are not limited thereto.

The display module 100 according to an embodiment of the present disclosure may further include a light blocking member 160. The light blocking member 160 may cover a front surface of the panel guide 140 adjacent to the light source unit 133, the light source PCB 133*a* of the light source unit 133, and a periphery of the optical sheet unit 137 adjacent to the light source unit 133, thereby reducing or preventing the light leakage of the light source unit 133. One side of the light blocking member 160 may extend to cover a side surface of the panel guide 140 adjacent to the light source unit 133, the cover sidewall 153 of the supporting cover 150, and a periphery of a rear surface of the cover plate 151. The light blocking member 160 may be a single-sided tape having black, but embodiments are not limited thereto.

The display module 100 according to an embodiment of the present disclosure may further include a panel connection member 170. The panel connection member 170 may be between the periphery of the rear surface of the display panel 110 and the panel guide 140, and may attach the display panel 110 to the panel guide 140. For example, the display panel 110 may be attached to the panel guide 140 by the panel connection member 170. The panel connection member 170 overlapping the light source unit 130 may be attached to the light blocking member 160. The panel connection member 170 according to an embodiment of the present disclosure may be a double-sided tape and/or a double-sided foam tape, but embodiments are not limited thereto.

The display module 100 may display an image using light provided to the display panel 110 by the backlight unit 130, and may output the sound waves PSW and ESW, generated based on a vibration of the display panel 110 responding to a vibration of the vibration plate 200, to a front portion of the display panel 110, for example, toward a face of a viewer. For example, the display module 100 may have a thin (or slim) structure having a thickness of about 4 mm or less to have the same vibration amount as that of the vibration plate 200.

The vibration plate 200 may be coupled or connected to the rear surface of the display module 100. The vibration plate 200 may be coupled or connected to the rear surface of the supporting cover 150 with the first air gap AG1 therebetween using the plate securing member 250, and may cover the opening 151a of the supporting cover 150. The vibration plate 200, as described above, may include one or more of: an Al material, a Mg material, an Al alloy material, a Mg alloy material, and a Mg—Li alloy material, but embodiments are not limited thereto. A duplicate description relevant thereto is omitted.

The plate securing member 250 may be between the cover plate 151 of the supporting cover 150 and the vibration plate 200 to support the vibration plate 200, and may provide the first air gap AG1 between the display module 100, for example, the reflective sheet 135 and the vibration plate 200. For example, the first air gap AG1 may be a vibration space or area for enabling a vibration of the vibration plate 200.

The vibration module 300 may be on a front surface of the vibration plate 200 to face the reflective sheet 135 of the backlight unit 130 through the opening 151a of the supporting cover 150. The vibration module 300 may vibrate according to the sound driving signal, which may be directly input from the system body 10, or may be indirectly input through the PCB 125 of the display module 100, thereby allowing the vibration plate 200 to vibrate. The vibration module 300 according to an embodiment of the present disclosure may include a first vibration element 310 and a second vibration element 330, which may be attached to the front surface of the vibration plate 200 by an element adhesive member 350. The first vibration element 310 and the second vibration element 330 may each include a piezoelectric material layer, e.g., as described above. Thus, detailed descriptions are not repeated.

The vibration plate 200 according to an embodiment of the present disclosure may include a first rear region and a second rear region, which may be parallel to a rear middle portion therebetween. For example, a center of the first vibration element 310 may be in a center of the first rear region of the vibration plate 200, and a center of the second vibration element 330 may be in a center of the second rear region of the vibration plate 200. Therefore, the first vibration element 310 and the second vibration element 330 may be symmetrical with respect to a center of the vibration plate 200, but may be asymmetrically disposed without being limited thereto.

The vibration plate 200 according to an embodiment of the present disclosure may include a communication part 210 between the plate securing member 250 and the vibration module 300. The communication part 210 according to a first embodiment of the present disclosure may include a plurality of first communication holes 211 and 212, which may be between each of the first and second vibration elements 310 and 330 and the plate securing member 250 with respect to a first lengthwise direction X of the display module 100.

One first communication hole 211 of the plurality of first communication holes 211 and 212 may be in a first periphery of the vibration plate 200 adjacent to a first sidewall 201 of the vibration plate 200, and the other first communication hole 212 of the plurality of first communication holes 211 and 212 may be in a second periphery of the vibration plate 200 adjacent to a second sidewall 202 of the vibration plate 200. For example, the communication part 210 according to a first embodiment of the disclosure may include two first communication holes 211 and 212, and one communication hole 211 of the two first communication holes 211 and 212 may be in a first periphery of the vibration plate 200 adjacent to the plate securing member 250 and between the first sidewall 201 of the vibration plate 200 and the first vibration element 310. Also, the other one communication hole 212 of the two first communication holes 211 and 212 may be in a second periphery of the vibration plate 200 adjacent to the plate securing member 250 and between the second sidewall 202 of the vibration plate 200 and the second vibration element 330, and may be parallel to the first communication hole 211. Therefore, the first and second vibration elements 310 and 330 and the plurality of first communication holes 211 and 212 may be disposed in parallel, but embodiments are not limited thereto. For example, one first communication hole 211 may be over or under the first vibration element 310, and the other first communication hole 212 may be over or under the second vibration element 330, with respect to a second lengthwise direction Y of each of the first and second vibration elements 310 and 330.

Each of the plurality of first communication holes 211 and 212 according to an embodiment of the present disclosure may have a rectangular shape, including a short side parallel to a first lengthwise direction X of the display module 100 and a long side parallel to a second lengthwise direction Y intersecting the first lengthwise direction X of the display module 100, or may have a tetragonal shape including rounded corners, but embodiments are not limited thereto. For example, each of the plurality of first communication holes 211 and 212 may have various shapes such as a circular shape, an oval shape, a polygonal shape, etc. An oval shape may include an elliptical shape, an egg-shape, a rectangular shape with rounded corners, or other non-circular curved shape having a width different than its height.

The communication part 210 according to the first embodiment of the present disclosure may communicate the first air gap AG1 on the front surface of the vibration plate 200 with the second air gap AG2 on the rear surface of the vibration plate 210, thereby enabling air to smoothly flow between the first and second air gaps AG1 and AG2 when the vibration plate 200 vibrates (or shakes). Therefore, the vibration plate 200 may vibrate stably. Thus, a sound pressure characteristic and a frequency characteristic of a low-pitched sound band based on the vibration of the vibration plate 200 may be enhanced.

The system rear cover 700 may accommodate the display module 100 and the vibration plate 200 coupled or connected to the vibration module 300. The system rear cover 700 according to an embodiment of the present disclosure may include a bottom structure 710 and a sidewall structure 730.

The bottom structure 710, e.g., an outermost rear structure on a rear surface of a display apparatus, may support a periphery of a rear surface of the supporting cover 150, and may cover the rear surface of the vibration plate 200 with the second air gap AG2 therebetween. For example, the bottom structure 710 may be spaced apart from the vibration plate 200 by a particular distance, such that it does not physically contact the vibration plate 200 when the vibration plate 200 vibrates. The sidewall structure 730, e.g., an outermost side structure on a side surface of the display apparatus, may be in a periphery of the bottom structure 710, and may cover side surfaces of the display module 100 and side surfaces of the vibration plate 200 with a border gap BG therebetween.

The system rear cover 700 according to an embodiment of the present disclosure may further include a rear sound guide member 750. The rear sound guide member 750 may protrude from a corner of the bottom structure 710 and the sidewall structure 730, or may be installed in the corner of the bottom structure 710 and the sidewall structure 730. The rear sound guide member 750 according to an embodiment of the present disclosure may include an inclined surface or a curved surface facing the second air gap AG2 and the border gap BG. The rear sound guide member 750 may guide a traveling path of a rear sound, traveling to the border gap BG via the second air gap AG2, to the border gap BG (for example, a direction toward a front surface of the display panel 110), thereby reducing or preventing the rear sound from being re-reflected to the second air gap AG2 by the sidewall structure 730 or reducing or minimizing the re-reflection of the rear sound.

The system front cover 900 may cover a periphery of a front surface of the display panel 110 and the border gap BG. The system front cover 900 may have a tetragonal frame shape, and may cover the periphery of the front surface of the display panel 110 and the border gap BG. The system front cover 900 may be connected to the sidewall structure 730 of the system rear cover 700 by a fastening member such as a hook. The system front cover 900 may cover the panel driving circuit unit 120 and a front surface of the display module 100, other than a display area of the display panel 110.

The system front cover 900 according to an embodiment of the present disclosure may include at least one sound output part 910 overlapping the border gap BG. The system front cover 900 may include a plurality of a sound output part 910 overlapping the border gap BG. The sound output part 910 may include a plurality of sound output holes 910a and 910b, which may vertically pass through the system front cover 900 overlapping the border gap BG, and may communicate the border gap BG with an outside. For example, the sound output part 910 may be in at least one of first to fourth corners of the system front cover 900 and a middle portion between first to fourth corners of the system front covers 900.

The display apparatus according to an embodiment of the present disclosure may further include a buffering member 500. The buffering member 500 may be in or on the vibration plate 200, and may be located near the first and second vibration elements 310 and 330. A height of the buffering member 500 may be greater than that of each of the first and second vibration elements 310 and 330 with respect to the front surface of the vibration plate 200. The buffering member 500 according to an embodiment of the present disclosure may include a foam pad. The buffering member 500 according to an embodiment of the present disclosure may have a polygonal shape or a circular shape that may surround the first vibration element 310 and the second vibration element 330, but embodiments are not limited thereto. The buffering member 500 may have various shapes, for example, a line or dot shape, e.g., for reducing or preventing a physical contact between each of the first and second vibration elements 310 and 330 and the reflective sheet 135 of the backlight unit 130.

A computing apparatus according to an embodiment of the present disclosure may output a panel sound wave PSW generated based on the vibration of the display panel 110 and an edge sound wave ESW, which may be generated based on a vibration of the vibration plate, and may be output to a region in front of the display panel 110 through the border gap BG to the region in front of the display panel 110, instead of a lower or rear portion of the display panel 110. Thus, sound may be accurately transferred, thereby improving sound quality to increase a viewer's immersion experience.

Moreover, a computing apparatus according to an embodiment of the present disclosure may output the panel sound wave PSW generated based on the vibration of the display panel 110 and the edge sound wave ESW, which may be generated based on a vibration of the vibration plate, and may be output to a front portion of the display panel 110 through the border gap BG, even without a speaker embedded into the system body 10. Accordingly, by removing the speaker embedded into the system body 10, a weight of the system body 10 may be reduced, or a battery may be provided in a space obtained by removing the speaker, thereby enabling the increase in size of the battery and/or decrease in a size of the system body.

Figure 6:
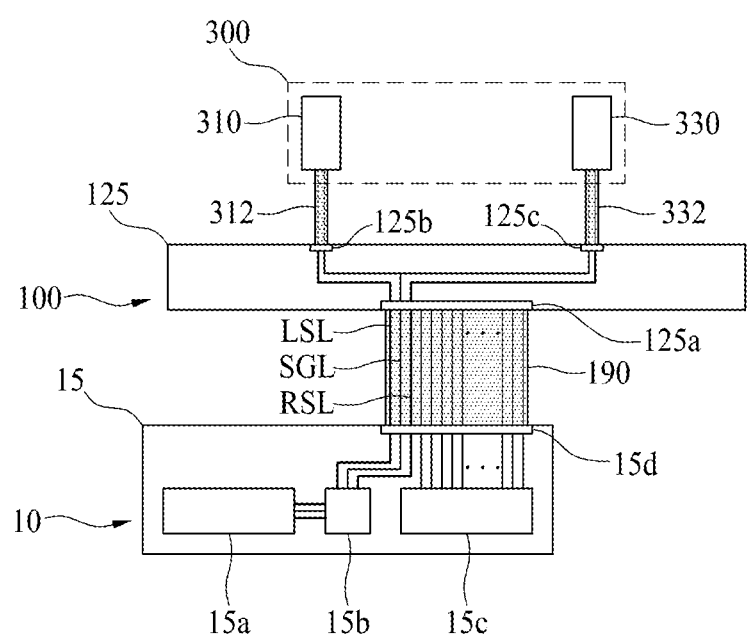
FIG. 6 illustrates a circuit connection structure of a system body, a printed circuit board, and a vibration module, according to an embodiment of the present disclosure.

FIG. 6 illustrates a circuit connection structure of a system body, a PCB, and a vibration module, according to an embodiment of the present disclosure.

With reference to the example of FIG. 6, along with the FIG. 2 example, in a computing apparatus according to an embodiment of the present disclosure, a system body 10 may generate a sound driving signal, and may supply the sound driving signal to a vibration module 300 through a display module 100. For example, the vibration module 300 may be driven by the sound driving signal supplied through the display module 100 from the system body 10.

A main board 15 of the system body 10 according to an embodiment of the present disclosure may include a sound processing circuit 15a, an audio amplifier 15b, a video processing circuit 15c, and a system connector 15d. The sound processing circuit 15a may generate a sound signal from digital sound data according to control by a central control circuit. The sound processing circuit 15a may be referred to as a "sound card."

The audio amplifier 15b may amplify the sound signal supplied from the sound processing circuit 15a to generate the sound driving signal. The audio amplifier 15b according to an embodiment of the present disclosure may amplify a sound line input signal supplied from the sound processing circuit 15a to an earphone port mounted on the main board 15 to generate the sound driving signal. The sound driving signal may be supplied to the system connector 15d on the main board 15.

The sound driving signal according to an embodiment of the present disclosure may include a left sound driving signal, including a positive left sound driving signal and a negative left sound driving signal, and a right sound driving signal including a positive right sound driving signal and a negative right sound driving signal. According to another embodiment of the present disclosure, the sound driving signal may include a positive left sound driving signal, a positive right sound driving signal, and a negative ground signal.

The video processing circuit 15c may generate video data from an image source. The video processing circuit 15c may output the video data to the system connector 15d.

The system connector 15d may include a plurality of display signal ports and a plurality of audio signal ports. For example, the display signal ports may include a plurality of data interface signal ports for supplying a PCB 125 with the video data generated by the video processing circuit 15c, a plurality of panel driving power ports, and a plurality of backlight driving power ports. The audio signal ports may include a plurality of sound output ports for supplying the PCB 125 with the sound driving signal generated by the audio amplifier 15b.

The system connector 15d may be connected to the PCB 125 of the display module 100 through a user cable 190. The user cable 190 may include a plurality of signal lines respectively connected to the ports in the system connector 15d. The user cable 190 may include a left sound signal line LSL, a right sound signal line RSL, and a sound ground signal line SGL, which may be connected to the sound output ports of the system connector 15d. The PCB 125 of the display module 100 may include the user connector 125a, a first sound output connector 125b, and a second sound output connector 125c. The user connector 125a may be connected to the system connector 15d of the main board 15 through the user cable 190, and may receive, through the user cable 190, various signals, including a sound signal, supplied from the main board 15.

The first sound output connector 125b may be connected to the user connector 125a through a signal transfer line provided on the PCB 125, and may output the left sound driving signal, supplied through the user connector 125a, to a first vibration element 310. The first sound output connector 125b may be connected to the first vibration element 310 through a first flexible circuit cable 312. Therefore, the first vibration element 310 may vibrate based on an electric field, which may be generated based on the positive left sound driving signal and the negative left sound driving signal, or based on the positive left sound driving signal and the negative ground signal, supplied through the first flexible circuit cable 312 from the first sound output connector 125b, thereby allowing a vibration plate, e.g., the vibration plate 200, to vibrate.

The second sound output connector 125c may be connected to the user connector 125a through the signal transfer line provided on the PCB 125, and may output the right sound driving signal, supplied through the user connector 125a, to a second vibration element 330. The second sound output connector 125c may be connected to the second vibration element 330 through a second flexible circuit cable 332. Therefore, the second vibration element 330 may vibrate based on an electric field, which may be generated based on the positive right sound driving signal and the negative right sound driving signal, or based on the positive right sound driving signal and the negative ground signal, supplied through the second flexible circuit cable 332 from the second sound output connector 125c, thereby allowing the vibration plate to vibrate.

According to an embodiment of the present disclosure, the sound driving signal may be supplied to the vibration module 300 through the PCB 125 of the display module 100 and the user cable 190 connected between the display module 100 and the main board 15. Thus, even without a separate cable, the sound driving signal may be supplied to the vibration module 300.

Moreover, the flexible circuit cables 312 and 332 of the vibration module 300 may be directly connected to the main board 15, without being connected to the PCB 125 of the display module 100. For example, the vibration module 300 may be driven according to the sound driving signal output from the audio amplifier 15b of the main board 15. If the flexible circuit cables 312 and 332 of the vibration module 300 are directly connected to the main board 15, the flexible circuit cables 312 and 332 of the vibration module 300 may be connected to the main board 15 in the system body 10 through the hinge part 20. As such, the cost may increase due to the increase in length of each of the flexible circuit cables 312 and 332, causing the reduction in the ability to assemble the system body 10 and the display apparatus 30. Therefore, as described above, the flexible circuit cables 312 and 332 of the vibration module 300 may be connected to the PCB 125 of the display module 100.

Figure 7:
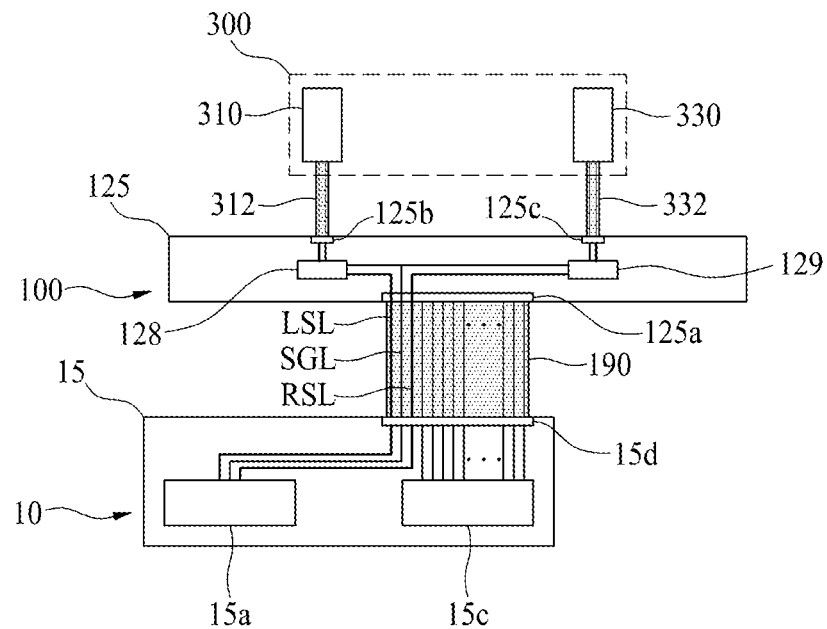
FIG. 7 illustrates a circuit connection structure of a system body, a printed circuit board, and a vibration module, according to another embodiment of the present disclosure.

FIG. 7 illustrates a circuit connection structure of a system body, a printed circuit board, and a vibration module, according to another embodiment of the present disclosure.

FIG. 7 illustrates an example that may be implemented by modifying a position of the audio amplifier illustrated in the example of FIG. 6. Thus, in the description below, only an audio amplifier and elements relevant thereto will be described, and descriptions of other elements are not repeated.

With reference to the example of FIG. 7, along with the FIG. 2 example, in a computing apparatus according to an embodiment of the present disclosure, a display module 100 may generate a sound driving signal, and may supply the sound driving signal to a vibration module 300. For example, the vibration module 300 may be driven by the sound driving signal generated and supplied by the display module 100.

A main board 15 of a system body 10 according to an embodiment of the present disclosure may include a sound processing circuit 15a, a video processing circuit 15c, and a system connector 15d. The main board 15 may not include the audio amplifier of the main board illustrated in FIG. 6, and may supply a sound signal generated by the sound processing circuit 15a to the display module 100 through the system connector 15d, without amplifying the sound signal. Therefore, the main board 15 according to an embodiment of the present disclosure may supply the display module 100 with the sound signal generated by the sound processing circuit 15a and two or more audio driving voltages and two or more audio ground voltages for driving the vibration module 300. As such, audio signal ports of the system connector 15d may further include two or more audio driving voltage ports and two or more audio ground voltage ports.

A PCB 125 of the display module 100 may include a user connector 125a, a first audio amplifier 128, a second audio amplifier 129, a first sound output connector 125b, and a second sound output connector 125c. The user connector 125a may be connected to the system connector 15d of the main board 15 through a user cable 190, and may receive, through the user cable 190, various signals, including a sound signal, supplied from the main board 15.

The first audio amplifier 128 may be connected to the user connector 125a through a signal transfer line provided on the PCB 125. The first audio amplifier 128 may receive a left sound signal, two or more audio driving voltages, and two or more audio ground voltages supplied through the user connector 125a, and may amplify the left sound signal using the received two or more audio driving voltages and two or more audio ground voltages to generate a left sound driving signal. As another example, the first audio amplifier 128 may receive the left sound signal and two or more backlight driving voltages supplied through the user connector 125a, and may amplify the left sound signal using the two or more backlight driving voltages to generate the left sound driving signal. For example, the main board 15 may receive the two or more audio driving voltages and the two or more audio ground voltages, and may not output the received two or more audio driving voltages and two or more audio ground voltages to the system connector 15d. Thus, the number of ports between the system connector 15d and the user connector 125a may be reduced.

The second audio amplifier 129 may be connected to the user connector 125a through the signal transfer line on the PCB 125. For example, the second audio amplifier 129 may receive a right sound signal, two or more audio driving voltages, and two or more audio ground voltages supplied through the user connector 125a, and may amplify the right sound signal using the received two or more audio driving voltages and two or more audio ground voltages to generate a right sound driving signal. In another example, the second audio amplifier 129 may receive the right sound signal and two or more backlight driving voltages supplied through the user connector 125a, and may amplify the right sound signal using the two or more backlight driving voltages to generate the right sound driving signal.

The first sound output connector 125b may be connected to the first audio amplifier 128 through the signal transfer line on the PCB 125, and may output the left sound driving signal, supplied from the first audio amplifier 128, to a first vibration element 310. The first sound output connector 125b may be connected to the first vibration element 310 through a first flexible circuit cable 312. Therefore, the first vibration element 310 may vibrate based on an electric field, which may be generated based on a positive left sound driving signal and a negative left sound driving signal, or based on the positive left sound driving signal and a negative ground signal supplied through the first flexible circuit cable 312 from the first sound output connector 125b, thereby allowing a vibration plate to vibrate.

The second sound output connector 125c may be connected to the second audio amplifier 129 through the signal transfer line on the PCB 125, and may output a right sound driving signal, supplied from the second audio amplifier 129, to a second vibration element 330. The second sound output connector 125c may be connected to the second vibration element 330 through a second flexible circuit cable 332. Therefore, the second vibration element 330 may vibrate based on an electric field, which may be generated based on a positive right sound driving signal and a negative right sound driving signal, or based on the positive right sound driving signal and a negative ground signal, supplied through the second flexible circuit cable 332 from the second sound output connector 125c, thereby allowing the vibration plate to vibrate.

According to an embodiment of the present disclosure, when the audio amplifiers 128 and 129 for generating the sound driving signal are mounted on the PCB 125, the loss of the sound driving signal transferred from the main board 150 to the PCB 125 of the display module 100 may be reduced or minimized, and signal interference between the sound driving signal and a display signal occurring in the user cable 190 may be reduced or minimized, thereby reducing or minimizing distortion of the display signal.

Figure 8:
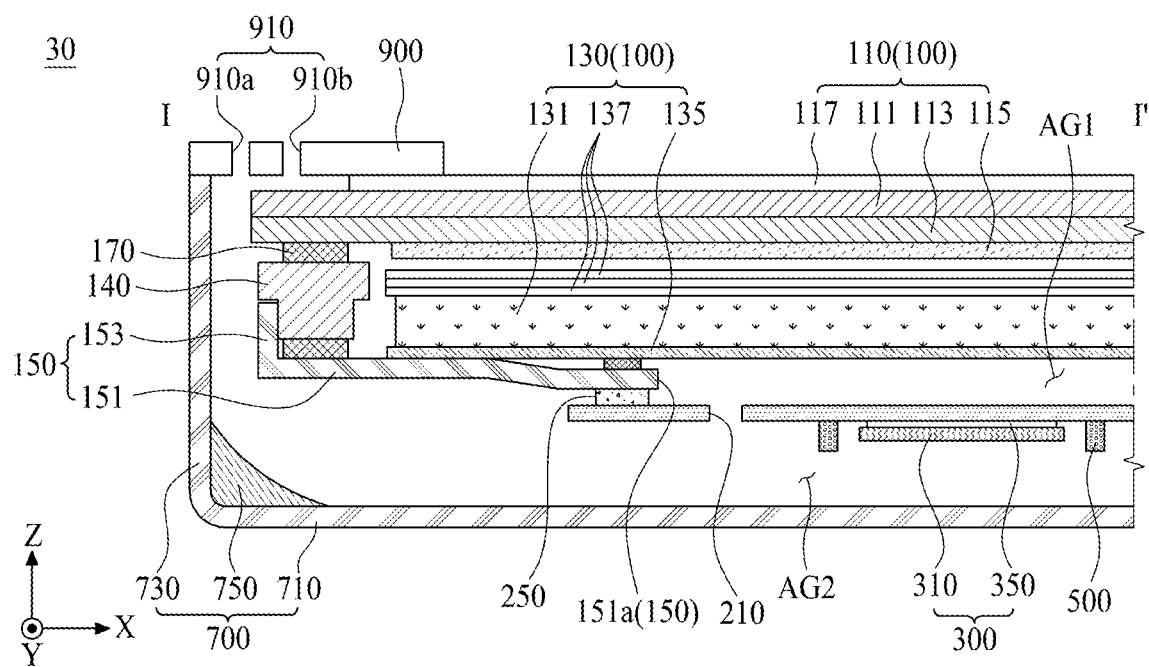
FIG. 8 is another cross-sectional view taken along line I-I' of FIG. 2.

FIG. 8 is another cross-sectional view taken along line I-I' of FIG. 2.

FIG. 8 illustrates an example implemented by modifying a disposition structure of a vibration module illustrated in the examples of FIGS. 3 and 4. Thus, in the description below, only a vibration module and elements relevant thereto will be described, and descriptions of other elements are not repeated.

With reference to the example of FIG. 8, along with the FIG. 2 example, in a computing apparatus according to an embodiment of the present disclosure, except that a first vibration element 310 and a second vibration element of a vibration module 300 are attached to a rear surface of a vibration plate 200 by an element adhesive member 350 to face a bottom structure 710 of a system rear cover 700, the first vibration element 310 and the second vibration element are substantially similar to the vibration elements illustrated in the examples of FIGS. 3 to 7.

According to an embodiment of the present disclosure, a substantially similar effect as that of the computing apparatus illustrated in the examples of FIGS. 3 to 7 may be obtained, and when the vibration module 300 is attached to the rear surface of the vibration plate 200, a height (or a thickness) of a plate securing member 250, for reducing or preventing a physical contact between the vibration module 300 and a display module 100, may be reduced. Thus, the cost of the plate securing member 250 may be reduced.

Figure 9:
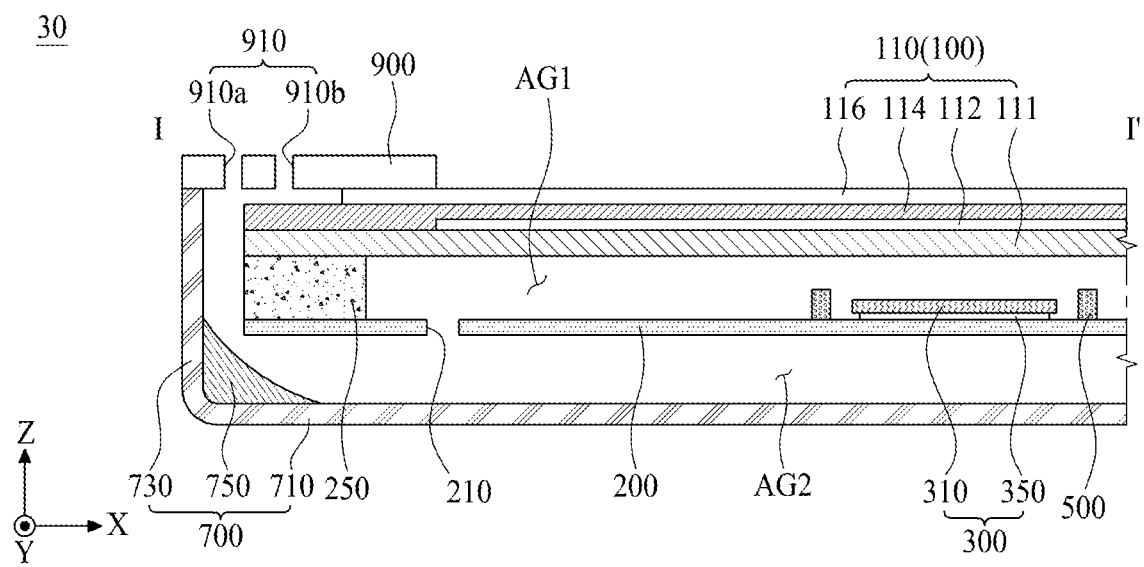
FIG. 9 is another cross-sectional view taken along line I-I' of FIG. 2.

FIG. 9 is another cross-sectional view taken along line I-I' of FIG. 2.

FIG. 9 illustrates an example implemented by modifying a configuration of the display apparatus illustrated in the examples of FIGS. 3 and 4. In the description below, only modified elements will be described in detail, and other elements are referred to by the reference numerals of the examples of FIGS. 2 to 7, and repetitive descriptions are omitted or will be briefly made.

With reference to the example of FIG. 9, along with the FIG. 2 example, in a computing apparatus according to an embodiment of the present disclosure, a display apparatus 30 may include a display module 100, a vibration plate 200, a vibration module 300, a system rear cover 700, and a system front cover 900. The display module 100 may be accommodated into the system rear cover 700, and may display an image. The display module 100 according to an embodiment of the present disclosure may include a display panel 110 that may display an image, and a panel driving circuit unit that may drive the display panel 110.

The display panel 110 may be a light-emitting display panel. The display panel 110 according to an embodiment of the present disclosure may include a pixel array substrate 111, including a pixel array 112 including a plurality of pixels, an encapsulation layer 114 that may encapsulate the pixel array 112, and an optical film 116 attached on a top of the encapsulation layer 114.

The plurality of pixels may be respectively provided in a plurality of pixel areas by a plurality of pixel driving lines. Each of the plurality of pixels may include a pixel circuit, including at least two thin film transistors (TFTs) and at least one capacitor, and a light-emitting device that may emit light with a current supplied from the pixel circuit. For example, the light-emitting device may include an organic light-emitting layer or a quantum dot light-emitting layer. As another example, the light-emitting device may include a micro light-emitting diode (LED). Embodiments are not limited to these examples.

The encapsulation layer 114 may protect the TFTs and the light-emitting device from an external impact. The encapsulation layer 114 may reduce or prevent moisture from penetrating into the light-emitting device.

The optical film 116 may be attached to an upper portion of the encapsulation layer 114 by a transparent adhesive member. The optical film 116 may be a polarization film, which may circularly polarize external light reflected by the TFT and/or the pixel driving lines on the pixel array substrate 111, thereby enhancing the visibility and contrast ratio of the display panel 110.

The display panel 110 according to an embodiment of the present disclosure may further include a barrier layer and a touch electrode layer between the encapsulation layer 114 and the optical film 116. Also, the display panel 110 may further include a color filter layer on an upper portion of the encapsulation layer 114.

The encapsulation layer 114 may be replaced with an encapsulation substrate, which may be attached to the pixel array substrate 111 by a filler surrounding the pixel array 112. If the filler is a transparent filler, the encapsulation substrate may be a transparent encapsulation substrate.

The panel driving circuit unit may be connected to a pad part in the display panel 110, and may display an image, e.g., corresponding to video data supplied from the system body 10, on each pixel. The panel driving circuit unit according to an embodiment of the present disclosure, as illustrated in the FIG. 4 example, may include the plurality of data flexible circuit films 121, the plurality of data driving ICs 123, the PCB 125, and the timing control circuit 127. Thus, a detailed description is not repeated.

The vibration plate 200 may be coupled or connected to the rear surface of the display module 100. The vibration plate 200 may be coupled or connected to the rear surface of the supporting cover 150 with a first air gap AG1 therebetween using the plate securing member 250, and may cover the opening 151a of the supporting cover 150. The vibration plate 200, as described above, may include, for example, an Al material, a Mg material, an Al alloy material, a Mg alloy material, and/or a Mg—Li alloy material, but embodiments are not limited thereto. A repetitive description relevant thereto is omitted.

The vibration module 300 may be attached to a front surface of the vibration plate 200 by an element adhesive member 350, or, as illustrated in the example of FIG. 8, may be attached to a rear surface of the vibration plate 200 by the element adhesive member 350. The vibration module 300 may include the above-described first vibration element 310 and second vibration element, and may be as described above. Thus, a detailed description is not repeated. A buffering member 500, as described above, may be near the vibration module 300.

The system rear cover 700 may accommodate the display module 100 and the vibration plate 200 coupled or connected to the vibration module 300. The system rear cover 700, as described above, may include a bottom structure 710, which may cover a rear surface of the vibration plate 200 with a second air gap AG2 therebetween; a sidewall structure 730, which may be in a periphery of the bottom structure 710, and may cover side surfaces of the display module 100 and side surfaces of the vibration plate 200; and a rear sound guide member 750, which may be provided in a corner of the bottom structure 710 and the sidewall structure 730.

The system front cover 900, as described above, may have a tetragonal frame shape, and may cover the front periphery of the display panel 110 and the border gap BG. Also, the system front cover 900 may include at least one sound output part 910 including a plurality of sound output holes 910a and 910b, which may vertically pass through the system front cover 900 overlapping the border gap BG, and may communicate the border gap BG with the outside.

The computing apparatus according to an embodiment of the present disclosure obtains a substantially similar effect as that of the computing apparatus illustrated in the examples of FIGS. 2 to 7.

FIGS. 10 to 13 illustrate a communication part according to second to fifth embodiments of the present disclosure.

Figure 10:
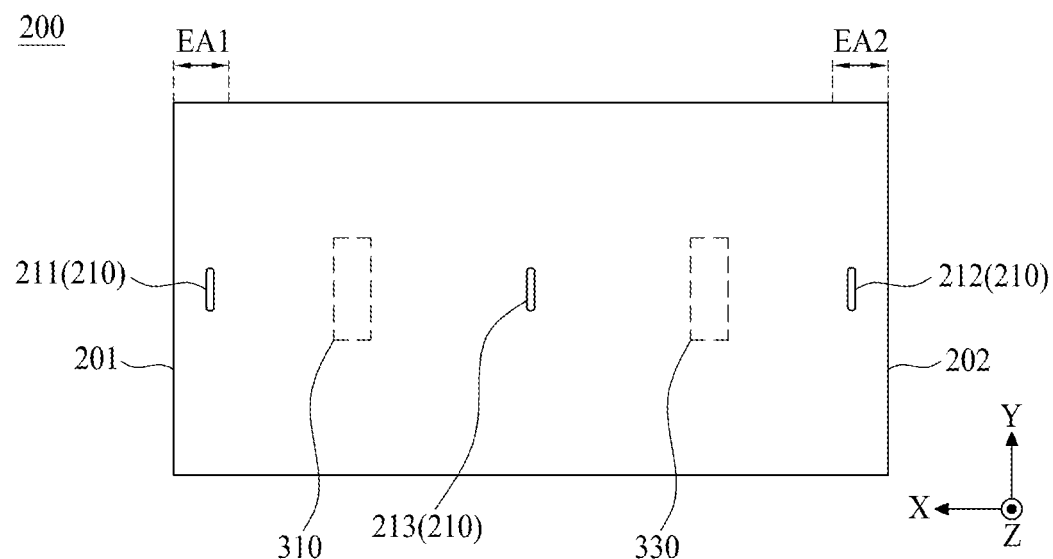
FIGS. 10 to 13 illustrate a communication part according to second to fifth embodiments of the present disclosure.

With reference to the example of FIG. 10, along with the FIG. 5 example, a communication part 210 according to the second embodiment of the present disclosure may include a plurality of first communication holes 211 and 212 and a middle communication hole 213. The communication part 210 according to the second embodiment of the present disclosure may be an element configured by adding the middle communication hole 213 to the communication part according to the first embodiment illustrated in the FIG. 5 example. The buffering member illustrated in FIG. 5 may not be provided.

The plurality of first communication holes 211 and 212 may be between each of the first and second vibration elements 310 and 330 and the plate securing member 250 with respect to the first lengthwise direction X of the display module 100. For example, one communication hole 211 of the plurality of first communication holes 211 and 212 may be in a first periphery EA1 of a vibration plate 200 adjacent to a first sidewall 201 of the vibration plate 200, and the other first communication hole 212 may be in a second periphery EA2 of the vibration plate 200 adjacent to a second sidewall 202 of the vibration plate 200. The one communication hole 211 of the plurality of first communication holes 211 and 212 may be on the left with respect to the first vibration element 310, and the other communication hole 212 of the plurality of first communication holes 211 and 212 may be on the right with respect to the second vibration element 330. It should be appreciated that the terms "left" and "right" are used for convenience herein, and are interchangeable.

The middle communication hole 213 may be further disposed between the first and second vibration elements 310 and 330 in parallel with the plurality of first communication holes 211 and 212. The middle communication hole 213 according to an embodiment of the present disclosure may be in a center of the vibration plate 200. For example, a distance between the first vibration element 310 and the middle communication hole 213 may be the same as a distance between the second vibration element 330 and the middle communication hole 213.

In the communication part 210 according to the second embodiment of the present disclosure, by further extending an air gap, which may be a space enabling the display module 100 and the vibration plate 200 to vibrate through the middle communication hole 213 between the first and second vibration elements 310 and 330, air may more smoothly flow between first and second air gaps when the vibration plate 200 vibrates (or shakes). Therefore, the vibration plate 200 may vibrates stably. Thus, a sound pressure characteristic and a frequency characteristic of a low-pitched sound band, based on the vibration of the vibration plate 200, may be enhanced.

Figure 11:
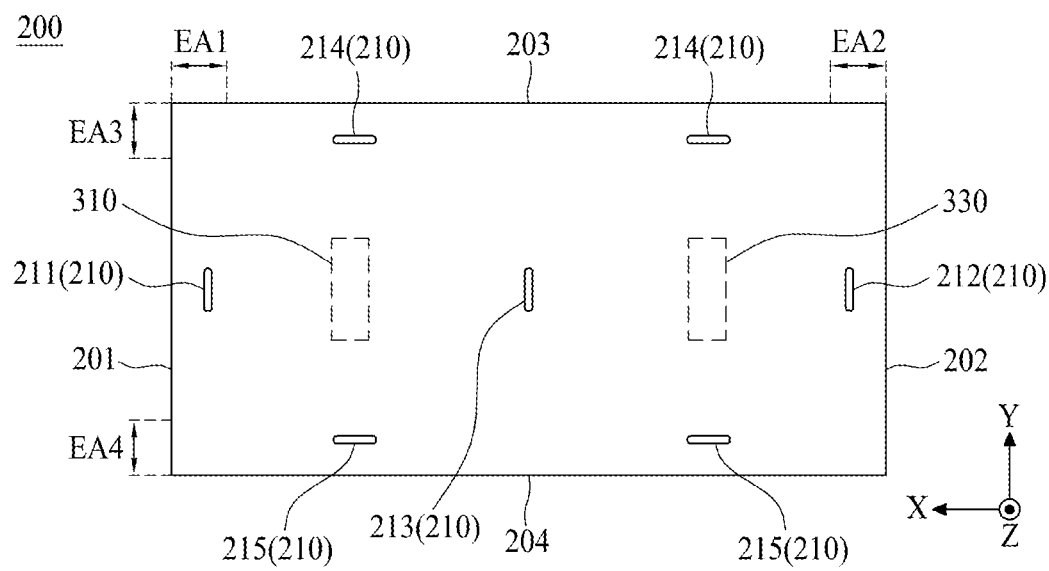

With reference to the example of FIG. 11, along with the FIG. 5 example, a communication part 210 according to the third embodiment of the present disclosure may include a plurality of first communication holes 211 and 212, a middle communication hole 213, and a plurality of second communication holes 214 and 215. The communication part 210 according to the third embodiment of the present disclosure may be an element configured by adding the plurality of second communication holes 214 and 215 to the communication part according to the second embodiment of the present disclosure illustrated in the FIG. 10 example.

The plurality of first communication holes 211 and 212 and the middle communication hole 213 may be the same as the communication holes illustrated in the example of FIG. 10. Thus, detailed descriptions are not repeated.

The plurality of second communication holes 214 and 215 may be between each of the first and second vibration elements 310 and 330 and the plate securing member 250 with respect to the second lengthwise direction Y of the display module 100. For example, one communication hole 214 of the plurality of second communication holes 214 and 215 may be in a third periphery EA3 of the vibration plate 200 adjacent to a third sidewall 203 of the vibration plate 200, and between each of the first and second vibration elements 310 and 330 and the third sidewall 203 of the vibration plate 200. The other communication hole 215 of the plurality of second communication holes 214 and 215 may be in a fourth periphery EA4 of the vibration plate 200 adjacent to a fourth sidewall 204 of the vibration plate 200, and between each of the first and second vibration elements 310 and 330 and the fourth sidewall 204 of the vibration plate 200.

Moreover, the one communication hole 211 of the plurality of first communication holes 211 and 212 may be on the left with respect to the first vibration element 310, and the plurality of second communication holes 214 and 215 may be over and under the first vibration element 310. Also, the other communication hole 212 of the plurality of first communication holes 211 and 212 may be on the right with respect to the second vibration element 330, and the plurality of second communication holes 214 and 215 may be over and under the second vibration element 330. In the communication part 210 according to the third embodiment of the present disclosure, the middle communication hole 213 may be omitted.

In the communication part 210 according to the third embodiment of the present disclosure, by further extending an air gap, which may be a space enabling the display module 100 and the vibration plate 200 to vibrate through the plurality of first communication holes 211 and 212, the middle communication hole 213, and the plurality of second communication holes 214 and 215, air may more smoothly flow between first and second air gaps when the vibration plate 200 vibrates (or shakes). Therefore, the vibration plate 200 may vibrate stably. Thus, a sound pressure characteristic and a frequency characteristic of a low-pitched sound band, based on the vibration of the vibration plate 200, may be enhanced.

Figure 12:
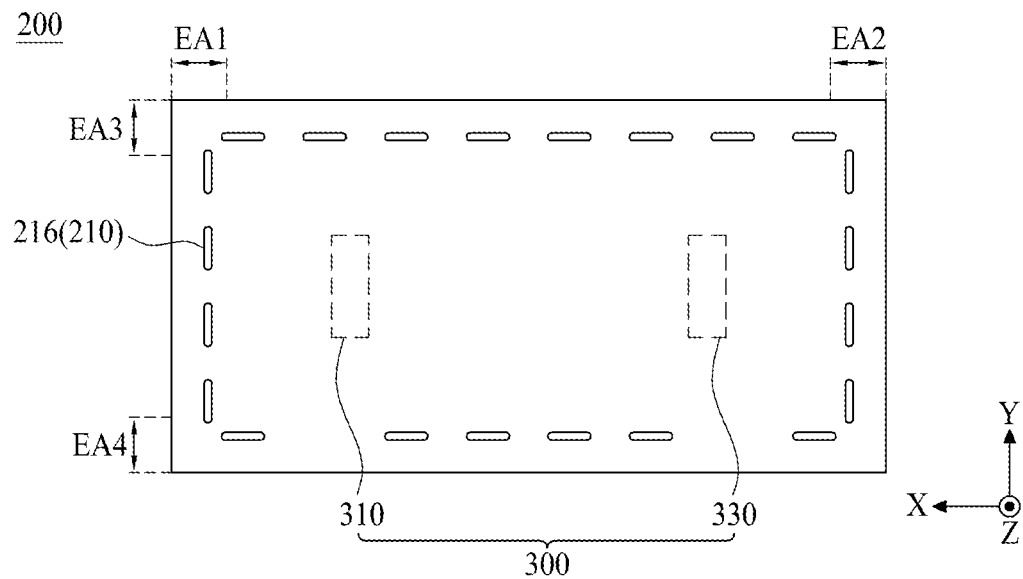

With reference to the example of FIG. 12, along with the FIG. 5 example, a communication part 210 according to a fourth embodiment of the present disclosure may include a plurality of communication holes 216. The plurality of communication holes 216 may be disposed along peripheries EA1 to EA4 of a vibration plate 200. For example, the plurality of communication holes 216 may be arranged at certain intervals along the peripheries EA1 to EA4 of the vibration plate 200 to surround a vibration module 300, but embodiments are not limited thereto. A length of each of the plurality of communication holes 216 and an interval between adjacent communication holes 216 may be within a range which avoids or prevents the vibration plate 200 from being torn or damaged when the vibration plate 200 vibrates. The plurality of communication holes 216 may be discontinuously arranged in a periphery of the vibration module 300.

In the communication part 210 according to the fourth embodiment of the present disclosure, by further extending an air gap, which may be a space enabling the display module 100 and the vibration plate 200 to vibrate through the plurality of communication holes 216 arranged at certain intervals along the peripheries EA1 to EA4 of the vibration plate 200, air may more smoothly flow between first and second air gaps when the vibration plate 200 vibrates (or shakes). Therefore, the vibration plate 200 may vibrate stably. Thus, a sound pressure characteristic and a frequency characteristic of a low-pitched sound band based on the vibration of the vibration plate 200 may be enhanced.

Figure 13:
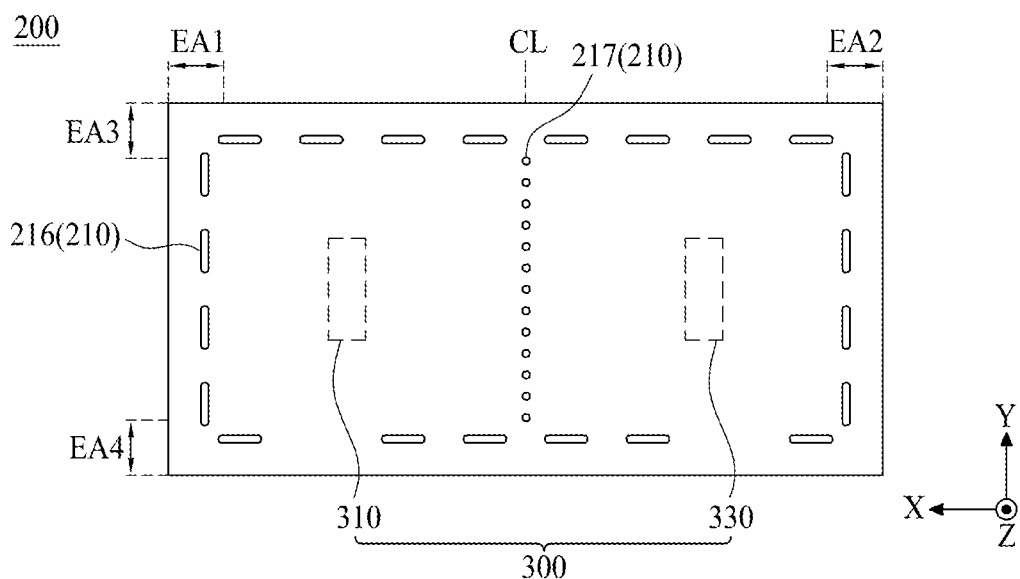

With reference to the example of FIG. 13, along with the FIG. 5 example, a communication part 210 according to the fifth embodiment of the present disclosure may include a plurality of communication holes 216 and a plurality of middle communication holes 217. The communication part 210 according to the fifth embodiment may be an element configured by adding the plurality of middle communication holes 217 to the communication part according to the fourth embodiment of the present disclosure illustrated in the FIG. 12 example.

The plurality of communication holes 216 may be the same as the communication holes illustrated in FIG. 12. Thus, detailed descriptions are not repeated.

The plurality of middle communication holes 217 may be between first and second vibration elements 310 and 330 along a second lengthwise direction Y of the display module 100. For example, the plurality of middle communication holes 217 may be arranged at certain intervals along a short side lengthwise direction Y of the vibration plate 200 at a long side middle portion CL of the vibration plate 200. A length of each of the plurality of communication holes 216, a length of each of the plurality of middle communication holes 217, an interval between adjacent communication holes 216, and an interval between adjacent middle communication holes 217 may be within a range that avoids or prevents the vibration plate 200 from being torn or damaged when the vibration plate 200 vibrates.

Each of the plurality of middle communication holes 217 according to an embodiment may have a circular shape, but embodiments are not limited thereto. For example, each of the plurality of middle communication holes 217 may have a respective shape that is the same as or different from that of each of the communication holes 216. For example, each of the plurality of middle communication holes 217 may have various shapes, such as a rectangular shape, a tetragonal shape including rounded corners, a circular shape, an oval shape, and a polygonal shape, but embodiments are not limited thereto.

In the communication part 210 according to the fifth embodiment of the present disclosure, by further extending an air gap, which may be a space enabling the display module 100 and the vibration plate 200 to vibrate through the plurality of communication holes 216, arranged at certain intervals along peripheries EA1 to EA4 of the vibration plate 200, and the plurality of middle communication holes 217 in the middle portion CL of the vibration plate 200, air may more smoothly flow between first and second air gaps when the vibration plate 200 vibrates (or shakes). Therefore, the vibration plate 200 may vibrate more stably. Thus, a sound pressure characteristic and a frequency characteristic of a low-pitched sound band based on the vibration of the vibration plate 200 may be enhanced.

Figure 14:
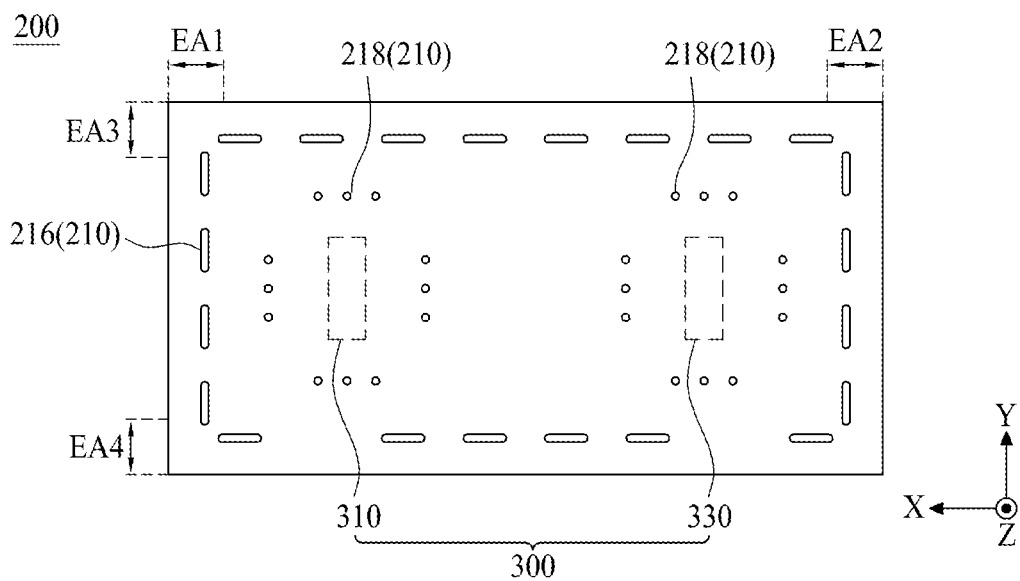
FIGS. 14 and 15 illustrate a communication part according to sixth and seventh embodiments of the present disclosure.
Figure 15:
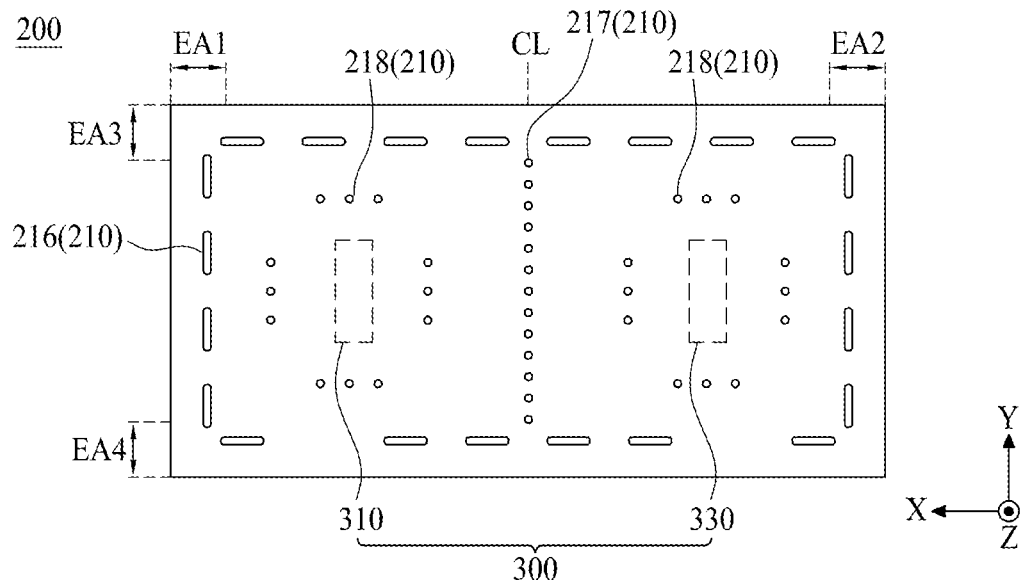

FIGS. 14 and 15 illustrate a communication part according to sixth and seventh embodiments of the present disclosure.

With reference to the example of FIG. 14, a communication part 210 according to the sixth embodiment of the present disclosure may include a plurality of communication holes 216 and a plurality of peripheral communication holes 218. The communication part 210 according to the sixth embodiment of the present disclosure may be an element configured by adding the plurality of peripheral communication holes 218 to the communication part according to the fourth embodiment illustrated of the present disclosure in the example of FIG. 12.

The plurality of communication holes 216 may be the same as the communication holes illustrated in FIG. 12. Thus, detailed descriptions are not repeated.

The plurality of peripheral communication holes 218 may be adjacent to each of the first and second vibration elements 310 and 330 to surround each of the first and second vibration elements 310 and 330. Each of the plurality of peripheral communication holes 218 may have a circular shape, but embodiments are not limited thereto. For example, each of the plurality of peripheral communication holes 218 may have a tetragonal shape.

In the communication part 210 according to the sixth embodiment of the present disclosure, due to the plurality of peripheral communication holes 218 adjacent to each of the first and second vibration elements 310 and 330, a vibration of each of the first and second vibration elements 310 and 330 may not be transferred to a periphery of the vibration plate 210. For example, in comparison with the communication part according to the fourth embodiment of the present disclosure, a sound pressure level and a frequency characteristic of a low-pitched sound band may be reduced, but the sixth embodiment of the present disclosure may be applied.

With reference to the example of FIG. 15, a communication part 210 according to the seventh embodiment of the present disclosure may include a plurality of communication holes 216, a plurality of peripheral communication holes 218, and a plurality of middle communication holes 217. The communication part 210 according to the seventh embodiment may be an element configured by adding the plurality of peripheral communication holes 218 to the communication part according to the fifth embodiment of the present disclosure illustrated in the example of FIG. 13.

The plurality of communication holes 216 may be the same as the communication holes illustrated in FIG. 12, the plurality of middle communication holes 217 may be the same as the middle communication holes illustrated in FIG. 13, and the plurality of peripheral communication holes 218 may be the same as the peripheral communication holes illustrated in FIG. 14. Thus, detailed descriptions are not repeated.

In the communication part 210 according to the seventh embodiment of the present disclosure, due to the plurality of peripheral communication holes 218 adjacent to each of the first and second vibration elements 310 and 330, a vibration of each of the first and second vibration elements 310 and 330 may not be transferred to a periphery of the vibration plate 210. For example, in comparison with the communication part according to the fifth embodiment of the present disclosure, a sound pressure level and a frequency characteristic of a low-pitched sound band may be reduced, but the seventh embodiment of the present disclosure may be applied.

Figure 16:
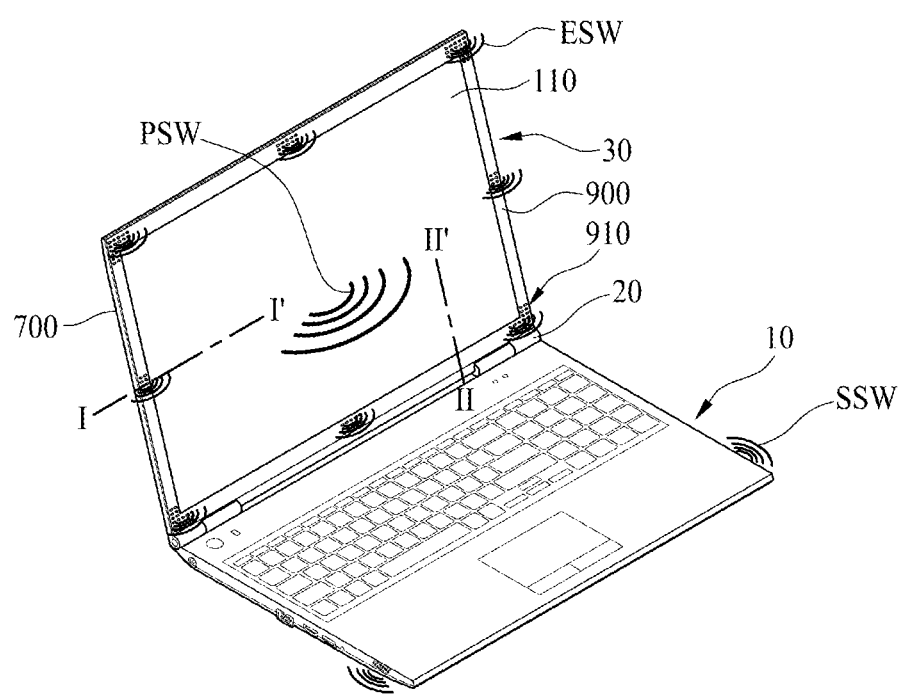
FIG. 16 illustrates a computing apparatus according to another embodiment of the present disclosure.
Figure 17:
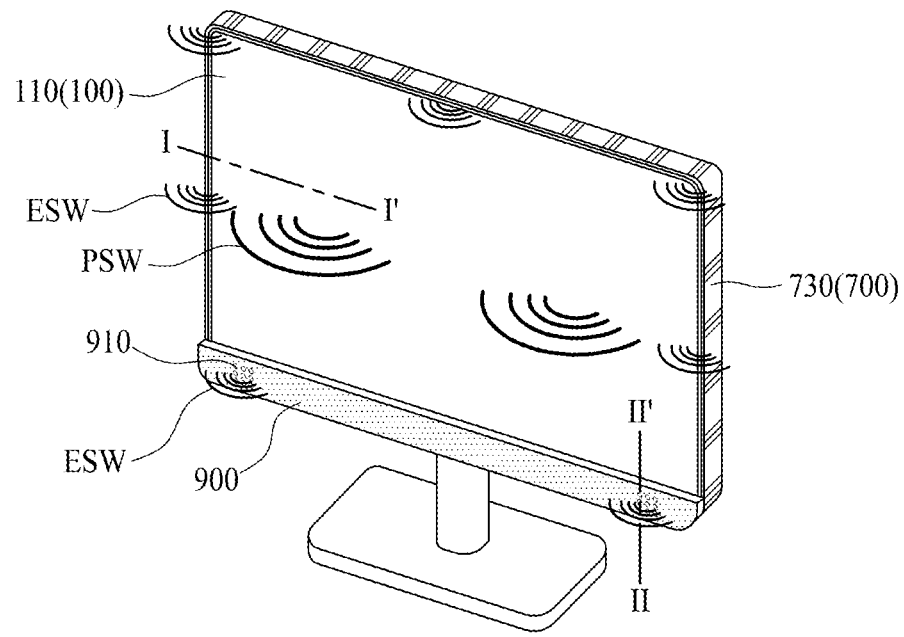
FIG. 17 illustrates a display apparatus according to an embodiment of the present disclosure.

FIG. 16 illustrates a computing apparatus according to another embodiment of the present disclosure. FIG. 17 illustrates a display apparatus according to an embodiment of the present disclosure.

With reference to the example of FIG. 16, the computing apparatus according to another embodiment of the present disclosure may include the display module and/or the communication part according to an embodiment of the present disclosure illustrated in the examples of FIGS. 3 to 13, and may include an embedded speaker mounted on a system body 10.

Therefore, the computing apparatus according to another embodiment of the present disclosure may realize a stereoscopic sound using a speaker sound wave SSW that may be output to a side of the system body 10 by the embedded speaker mounted on the system body 10, a panel sound wave PSW that may be directly output to a region in front of the display panel 110 according to a vibration of the display panel 110 caused by a vibration of each of the vibration module and the vibration plate, and an edge sound wave ESW that may be output to a region in front of the display panel 110 through the border gap BG according to a vibration of the vibration plate.

In the computing apparatus according to the present disclosure illustrated in the examples of FIGS. 1 to 16, the display apparatus 30 may be used as a display apparatus, such as a television (TV) (as illustrated in the FIG. 17 example), a monitor, a navigation device, an electronic pad, and/or a tablet computer, although embodiments are not limited to these examples. A cross-sectional view taken along line I-I' of FIG. 17 is the same as that illustrated in the examples of FIGS. 3, 8, and 9, and a cross-sectional view taken along line II-II' of FIG. 17 is the same as that illustrated in the example of FIG. 14.

The display apparatus according to an embodiment of the present disclosure illustrated in the example of FIG. 17 may realize a stereoscopic sound using a panel sound wave PSW that may be directly output to a region in front of the display panel 110 according to a vibration of the display panel 110 caused by a vibration of each of the vibration module and the vibration plate, and an edge sound wave ESW that may be output to a region in front of the display panel 110 through the border gap BG according to a vibration of the vibration plate.

Figure 18:
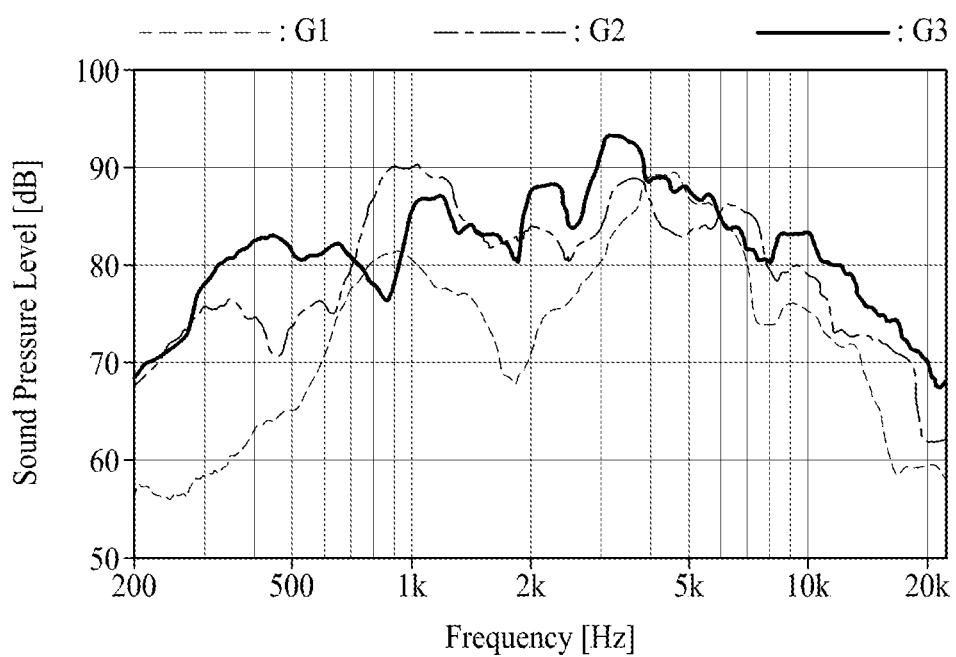
FIG. 18 illustrates experimental results of sound output characteristics of a computing apparatus according to an embodiment of the present disclosure and computing apparatuses of a comparative example 1 and a comparative example 2.

FIG. 18 illustrates experimental results of sound output characteristics of a computing apparatus according to an embodiment of the present disclosure and computing apparatuses of a comparative example 1 and a comparative example 2.

In FIG. 18, the abscissa axis (x-axis) represents a frequency in hertz (Hz), and the ordinate axis (y-axis) represents a sound pressure level in decibels (dB). Here, the computing apparatus of the comparative example 1 is an LG NOTEBOOK GRAM 15™ and a simulation result of the comparative example 1 is a simulation result of the LG NOTEBOOK GRAM 15™. In FIG. 18, a first graph G1 (a dotted line) shows a sound output characteristic of an embedded speaker mounted on each of a left side and a right side of a system body in the computing apparatus of the comparative example 1, a second graph G2 (a dash-single dotted line) shows a sound output characteristic of the computing apparatus of a comparative example 2, and a third graph G3 (a thick solid line) shows a sound output characteristic of the computing apparatus according to an embodiment of the present disclosure.

As seen in FIG. 18, it can be confirmed that, in a low-pitched sound band frequency of about 800 Hz or less, the computing apparatus of the present disclosure shown in the third graph G3 has a sound pressure characteristic that is relatively better than the computing apparatus of the comparative example 1 shown in the first graph G1 and the computing apparatus of the comparative example 2 shown in the second graph G2. For example, it can be confirmed that in a middle sound band frequency of about 800 Hz to 5 kHz, the computing apparatus according to an embodiment of the present disclosure has a sound pressure characteristic that is relatively better than the computing apparatus of the comparative example 1.

Figure 19:
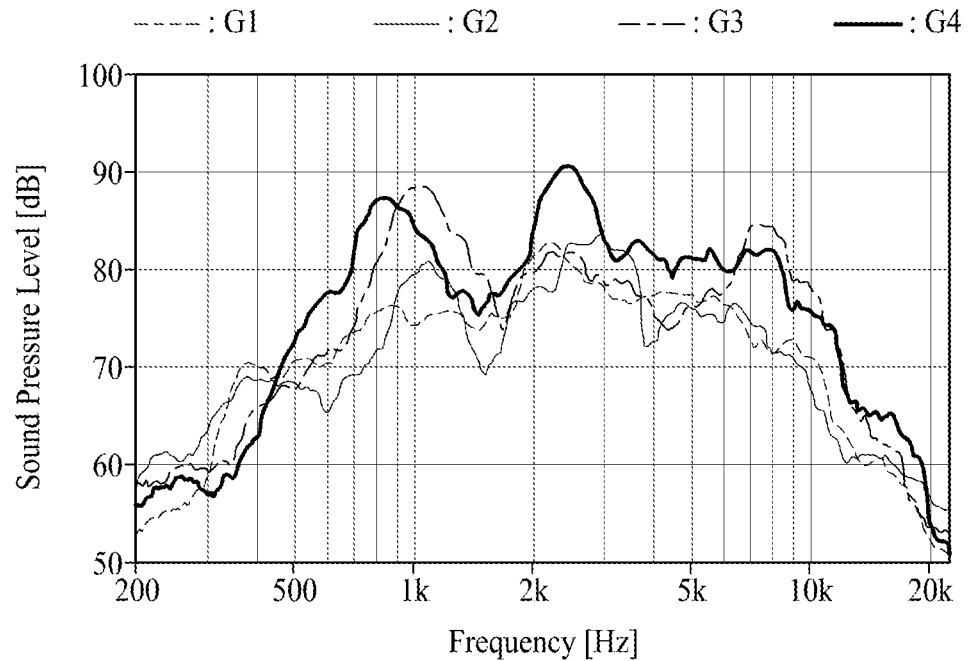
FIG. 19 illustrates experimental results of a sound output characteristic based on a size of a first air gap in a display apparatus and a computing apparatus including the same according to an embodiment of the present disclosure.

FIG. 19 illustrates experimental results of a sound output characteristic based on a size of a first air gap in a display apparatus and a computing apparatus including the same according to an embodiment of the present disclosure.

In FIG. 19, the abscissa axis (x-axis) represents a frequency in hertz (Hz), and the ordinate axis (y-axis) represents a sound pressure level in decibels (dB). In FIG. 19, a first graph G1 (a dotted line) shows a sound output characteristic based on a first air gap of 0.86 mm, a second graph G2 (a thin solid line) shows a sound output characteristic based on a first air gap of 1.72 mm, a third graph G3 (a dash-single dotted line) shows a sound output characteristic based on a first air gap of 2.58 mm, and a fourth graph G4 (a thick solid line) shows a sound output characteristic based on a first air gap of 5.16 mm.

As seen in FIG. 19, it can be confirmed that as a size of the first air gap increases, a sound pressure characteristic in a middle sound band frequency (e.g., about 800 Hz to 5 kHz) is enhanced. However, because an increase in the first air gap may lead to an increase in thickness of each of the display apparatus and the computing apparatus including the same, there may be a limitation in increasing the sound pressure characteristic in the middle sound band frequency (e.g., about 800 Hz to 5 kHz). Therefore, in the display apparatus and the computing apparatus including the same according to an embodiment of the present disclosure, the first air gap may extend using a communication part, which may be provided in a vibration plate. Thus, the sound pressure characteristic in the middle sound band frequency (e.g., about 800 Hz to 5 kHz) may be enhanced without any increase in thickness of each of the display apparatus and the computing apparatus including the same.

Figure 20:
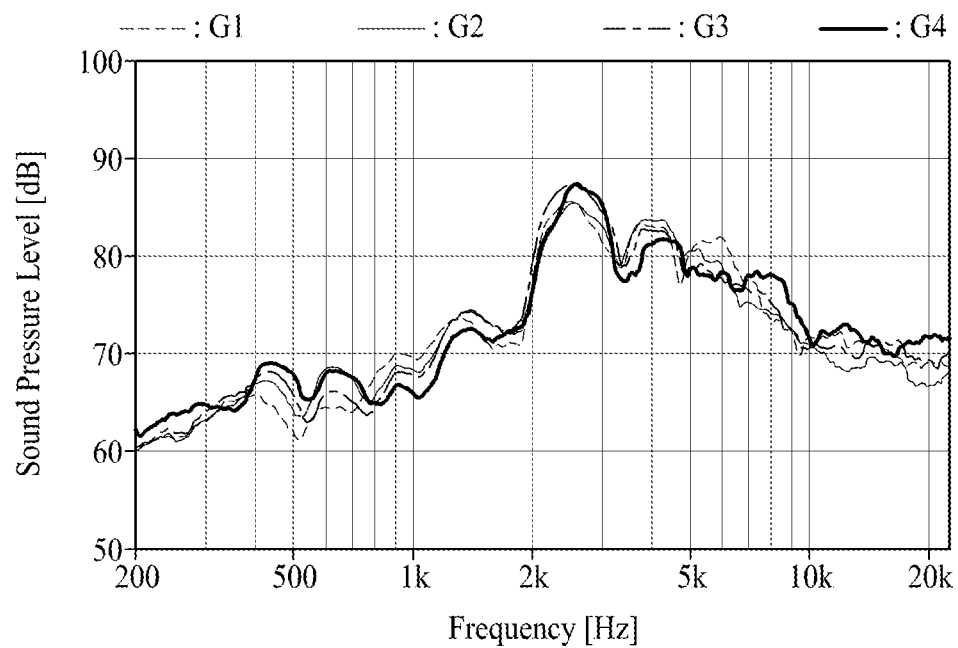
FIG. 20 illustrates experimental results of sound output characteristics of a vibration plate according to first to third embodiments of the present disclosure and a comparative example without a communication part.

FIG. 20 illustrates experimental results of sound output characteristics of a vibration plate according to first to third embodiments of the present disclosure and a comparative example without a communication part.

In FIG. 20, the abscissa axis (x-axis) represents a frequency in hertz (Hz), and the ordinate axis (y-axis) represents a sound pressure level in decibels (dB). In FIG. 20, a first graph G1 (a dotted line) shows a sound output characteristic of a vibration plate according to the comparative example, a second graph G2 (a thin solid line) shows a sound output characteristic of a vibration plate according to the first embodiment of the present disclosure illustrated in the FIG. 5 example, a third graph G3 (a dash-single dotted line) shows a sound output characteristic of a vibration plate according to the second embodiment of the present disclosure illustrated in the FIG. 10 example, and a fourth graph G4 (a thick solid line) shows a sound output characteristic of a vibration plate according to the third embodiment of the present disclosure illustrated in the FIG. 11 example.

As seen in FIG. 20, it can be confirmed that, in comparison with the sound output characteristic G1 of the vibration plate according to the comparative example, the sound output characteristic G2 of the vibration plate according to the first embodiment of the present disclosure shows a sound pressure level that increases in a band of about 400 Hz to 800 Hz. It can be confirmed that, in comparison with the sound output characteristic G1 of the vibration plate according to the comparative example, the sound output characteristic G3 of the vibration plate according to the second embodiment of the present disclosure shows a sound pressure level that increases in a band of about 400 Hz to 800 Hz and about 2 kHz to 3 kHz. It can be confirmed that, in comparison with the sound output characteristic G1 of the vibration plate according to the comparative example, the sound output characteristic G4 of the vibration plate according to the third embodiment of the present disclosure shows a sound pressure level that increases in a band of about 400 Hz to 800 Hz and about 2 kHz to 3 kHz. For example, it can be confirmed that, in comparison with the sound output characteristic G1 of the vibration plate according to the comparative example, the sound output characteristic G4 of the vibration plate according to the third embodiment of the present disclosure shows a sound pressure level that increases in a low-pitched sound band of about 350 Hz or less.

Therefore, in the display apparatus and the computing apparatus including the same according to an embodiment of the present disclosure, when at last one communication hole is provided in each of left and right sides or upper, lower, left, and right sides of a vibration element coupled or connected to a vibration plate, a sound pressure characteristic and a frequency characteristic of each of a low-pitched sound band and a middle sound band may be enhanced. When tuning a sound characteristic of a vibration element that has a relatively good sound pressure characteristic of a middle-high-pitched sound band, a sound quality may be enhanced in a whole sound band.

Figure 21:
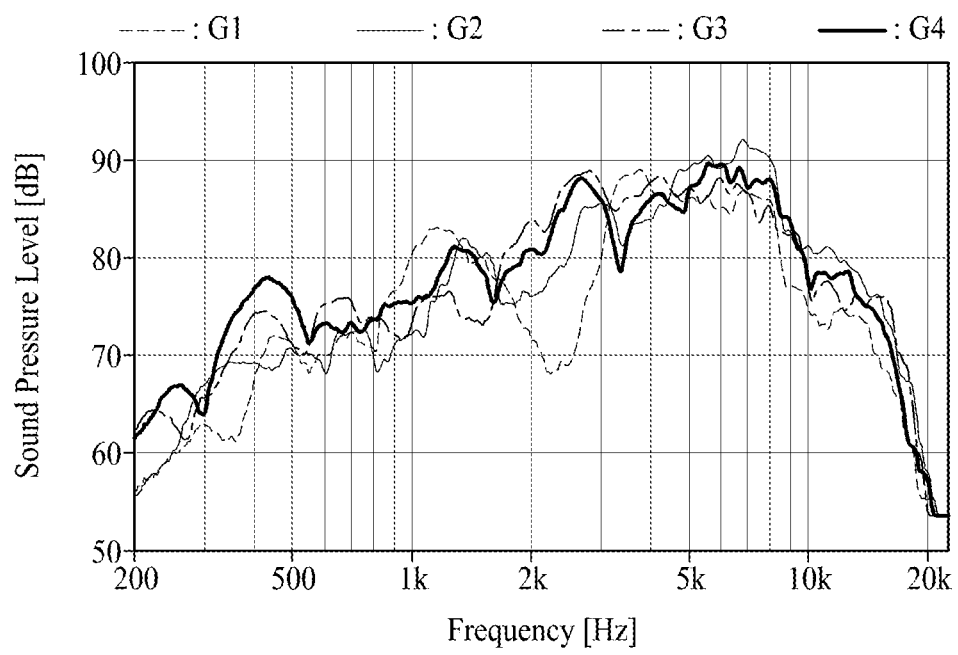
FIG. 21 illustrates experimental results of sound output characteristics of a vibration plate according to fourth and fifth embodiments of the present disclosure and a vibration plate according to sixth and seventh embodiments of the present disclosure.

FIG. 21 illustrates experimental results of sound output characteristics of a vibration plate according to fourth and fifth embodiments of the present disclosure and a vibration plate according to sixth and seventh embodiments of the present disclosure.

In FIG. 21, the abscissa axis (x-axis) represents a frequency in hertz (Hz), and the ordinate axis (y-axis) represents a sound pressure level in decibels (dB). In FIG. 21, a first graph G1 (a dotted line) shows a sound output characteristic of a vibration plate according to the sixth embodiment of the present disclosure illustrated in the FIG. 14 example, a second graph G2 (a thin solid line) shows a sound output characteristic of a vibration plate according to the seventh embodiment of the present disclosure illustrated in the FIG. 15 example, a third graph G3 (a dash-single dotted line) shows a sound output characteristic of a vibration plate according to the fourth embodiment of the present disclosure illustrated in the FIG. 12 example, and a fourth graph G4 (a thick solid line) shows a sound output characteristic of a vibration plate according to the fifth embodiment of the present disclosure illustrated in the FIG. 13 example.

As seen in FIG. 21, it can be confirmed that, in comparison with the sound output characteristic G1 of the vibration plate according to the sixth embodiment of the present disclosure and the sound output characteristic G2 of the vibration plate according to the seventh embodiment of the present disclosure, the sound output characteristic G3 of the vibration plate according to the fourth embodiment of the present disclosure and the sound output characteristic G4 of the vibration plate according to the fifth embodiment of the present disclosure show a sound pressure level that increases in a band of about 350 Hz to 800 Hz and about 1.8 kHz to 3 kHz. Accordingly, it can be confirmed that, in comparison with the sound output characteristic G1 of the vibration plate according to the sixth embodiment of the present disclosure, the sound output characteristic G3 of the vibration plate according to the fourth embodiment of the present disclosure shows a sound pressure level that increases in a band of about 350 Hz to 800 Hz and about 1.8 kHz to 3 kHz. Also, it can be confirmed that, in comparison with the sound output characteristic G2 of the vibration plate according to the seventh embodiment of the present disclosure, the sound output characteristic G4 of the vibration plate according to the fifth embodiment of the present disclosure shows a sound pressure level that increases in a band of about 2 kHz to 3 kHz.

Therefore, in the display apparatus and the computing apparatus including the same according to the present disclosure, when a plurality of communication holes are provided along a periphery of a vibration plate, a sound pressure characteristic and a frequency characteristic of a low-pitched sound band may be enhanced. When a plurality of communication holes are additionally provided in a middle portion of the vibration plate, a sound pressure characteristic and a frequency characteristic of a middle sound band may be further enhanced.

The display apparatus and the computing apparatus including the same according to the embodiments of the present disclosure may be applied to desktop personal computers (PCs), laptop PCs, netbook computers, workstations, navigation apparatuses, automotive navigation apparatuses, automotive display apparatuses, TVs, wall paper display apparatuses, signage apparatuses, game machines, monitors, cameras, camcorders, home appliances, etc. Embodiments are not limited to these examples.

A display apparatus according to the present disclosure will be described below.

According to an embodiment of the present disclosure, a display apparatus may include: a display module including a display panel configured to display an image, a vibration plate on the display module, a first air gap between the vibration plate and the rear surface of the display module, a vibration module on the vibration plate, and a system rear cover on the vibration plate, a second air gap between the system rear cover and the vibration plate. The vibration plate may include a communication part configured to allow air to flow between the first air gap and the second air gap.

For example, in the display apparatus according to an embodiment of the present disclosure, the first air gap may be provided using a plate securing member, and the communication part may be between the plate securing member and the vibration module. For example, in the display apparatus according to an embodiment of the present disclosure, wherein the communication part may be in a periphery of the vibration plate. For example, in the display apparatus according to an embodiment of the present disclosure, the communication part may include a plurality of communication holes arranged along a periphery of the vibration plate.

For example, in the display apparatus according to an embodiment of the present disclosure, the display module may include: a first rear region, and a second rear region, the vibration module may include: a first vibration element on the first rear region of the display module, and a second vibration element on the second rear region of the display module, and the communication part may include a plurality of first communication holes arranged along a first lateral direction of the display module. For example, in the display apparatus according to an embodiment of the present disclosure, the communication part further may include a middle communication hole between the first vibration element and the second vibration element. For example, in the display apparatus according to an embodiment of the present disclosure, the communication part further may include a plurality of second communication holes arranged along a second lateral direction of the display module, the second lateral direction being perpendicular to the first lateral direction.

For example, in the display apparatus according to an embodiment of the present disclosure, the communication part further may include a middle communication hole between the first vibration element and the second vibration element. For example, in the display apparatus according to an embodiment of the present disclosure, each of the first vibration element and the second vibration element may include a piezoelectric material layer.

For example, in the display apparatus according to an embodiment of the present disclosure, the display module may include: a first rear region, and a second rear region, the vibration module may include: a first vibration element on the first rear region of the display module, and a second vibration element on the second rear region of the display module, and the communication part may include a plurality of communication holes arranged along a periphery of the vibration plate. For example, in the display apparatus according to an embodiment of the present disclosure, each of the first vibration element and the second vibration element may include a piezoelectric material layer.

For example, the display apparatus according to an embodiment of the present disclosure may further include a respective buffering member near each of the first vibration element and the second vibration element, and a height of the buffering member may be greater than a height of each of the first vibration element and the second vibration element with respect to a front surface of the vibration plate. For example, in the display apparatus according to an embodiment of the present disclosure, the communication part further may include a plurality of peripheral communication holes surrounding the vibration module.

For example, in the display apparatus according to an embodiment of the present disclosure, the communication part further may include a plurality of middle communication holes between the first vibration element and the second vibration element along a second lateral direction of the display module. For example, in the display apparatus according to an embodiment of the present disclosure, the communication part further may include a plurality of peripheral communication holes surrounding the vibration module.

For example, in the display apparatus according to an embodiment of the present disclosure, the display module may include: a panel guide configured to support the display panel, and a supporting cover configured to accommodate the panel guide, and the vibration plate may be on a rear surface of the supporting cover. For example, in the display apparatus according to an embodiment of the present disclosure, the supporting cover may include a cover plate including an opening overlapping a portion other than a periphery of the display panel, and the vibration plate may be connected to the cover plate and may be configured to cover the opening of the supporting cover.

For example, in the display apparatus according to an embodiment of the present disclosure, the vibration plate may be on a rear surface of the display panel using a plate securing member, and the plate securing member may be configured to provides a first air gap between the rear surface of the display panel and the vibration plate. For example, in the display apparatus according to an embodiment of the present disclosure, the system rear cover may include: a bottom structure covering the rear surface of the vibration plate, a sidewall structure surrounding a side surface of the display module, and a border gap between the sidewall structure and the side surface of the display module.

For example, in the display apparatus according to an embodiment of the present disclosure, the system rear cover further may include a rear sound guide member protruding from a corner of the bottom structure and the sidewall structure, and the rear sound guide member has a curved surface facing the second air gap and the border gap.

For example, the display apparatus according to an embodiment of the present disclosure may further include a system front cover covering a periphery of the front surface of the display module and the border gap, the system front cover including at least one sound output part overlapping the border gap. For example, in the display apparatus according to an embodiment of the present disclosure, the vibration plate may include one or more of: an aluminum (Al) material, a magnesium (Mg) material, an Al alloy material, a Mg alloy material, and a Mg-lithium (Li) alloy material.

For example, in the display apparatus according to an embodiment of the present disclosure, the vibration plate has a thickness of 0.1 mm to 2.0 mm. For example, in the display apparatus according to an embodiment of the present disclosure, the display module may include: a printed circuit board connected to the display panel, a user connector on the printed circuit board, a sound output connector connected to the vibration module, and an audio amplifier in the printed circuit board, the audio amplifier being configured to: amplify a sound signal input through the user connector to generate a sound driving signal, and output the generated sound driving signal to the sound output connector.

A computing apparatus according to an embodiment of the present disclosure will be described below.

According to an embodiment of the present disclosure, a computing apparatus may include: a system body, a display apparatus including: a display module including a display panel configured to display an image, a vibration plate on a rear surface of the display module, a first air gap between the vibration plate and the rear surface of the display module, a vibration module on the vibration plate, and a system rear cover on a rear surface of the vibration plate, a second air gap between the system rear cover and the rear surface of the vibration plate. The vibration plate may include a communication part configured to allow air to flow between the first air gap and the second air gap, and a hinge part between the system body and the display apparatus, the hinge part being configured to rotatably support the display apparatus.

For example, in the computing apparatus according to an embodiment of the present disclosure, the display module may include: a printed circuit board connected to the display panel, a user connector on the printed circuit board, the user connector being configured to receive a sound signal input from the system body, a sound output connector on the printed circuit board, the sound output connector being connected to the vibration module, and an audio amplifier on the printed circuit board, the audio amplifier being configured to: amplify the sound signal input through the user connector to generate a sound driving signal, and output the generated sound driving signal to the sound output connector.

For example, in the computing apparatus according to an embodiment of the present disclosure, the system body may include a main board including: a sound processing circuit configured to generate a sound signal, and an audio amplifier configured to amplify the sound signal to generate a sound driving signal, and the display module may include: a printed circuit board connected to the display panel, a user connector on the printed circuit board, the user connector being configured to receive the sound driving signal input from the system body, and a sound output connector connected to the vibration module, the sound output connector being configured to output the sound driving signal, input through the user connector, to the vibration module.

In the display apparatus and the computing apparatus including the same according to an embodiment of the present disclosure, when sound is output to a region in front of the display panel using a vibration of the display panel, sound having high-pitched sound quality and a broad sound band may be output, and a sound that fully fills a whole screen may be realized, whereby a viewer's immersion experience may be enhanced due to harmony (or match) between an image and sound.

It will be apparent to those skilled in the art that various modifications and variations may be made in the present disclosure without departing from the technical idea or scope of the disclosure. Thus, it may be intended that embodiments of the present disclosure cover the modifications and variations of the disclosure provided they come within the scope of the appended claims and their equivalents.

What is claimed is:

1. A display apparatus, comprising:
a display module comprising a display panel configured to display an image;
a vibration plate on the display module;
a first air gap between the vibration plate and the rear surface of the display module;
a vibration module on the vibration plate; and
a system rear cover on the vibration plate;
a second air gap between the system rear cover and the vibration plate,
wherein the vibration plate comprises a communication part configured to allow air to flow between the first air gap and the second air gap, and
wherein the communication part comprises:
a plurality of first communication holes through the vibration plate and arranged along a first lateral direction of the display module, and
a plurality of second communication holes arranged along a second lateral direction of the display module, the second lateral direction being perpendicular to the first lateral direction.

2. The display apparatus of claim 1, wherein:
the first air gap is provided using a plate securing member; and
the communication part is between the plate securing member and the vibration module.

3. The display apparatus of claim 2, wherein the communication part is in a periphery of the vibration plate.

4. The display apparatus of claim 2, wherein the plurality of communication holes is arranged along a periphery of the vibration plate.

5. The display apparatus of claim 2, wherein:
the display module comprises:
a first rear region; and
a second rear region; and
the vibration module comprises:
a first vibration element on the first rear region of the display module; and
a second vibration element on the second rear region of the display module.

6. The display apparatus of claim 5, wherein the communication part further comprises a middle communication hole through the vibration plate between the first vibration element and the second vibration element.

7. The display apparatus of claim 5, wherein each of the first vibration element and the second vibration element comprises a piezoelectric material layer.

8. The display apparatus of claim 2, wherein:
the display module comprises:
a first rear region; and
a second rear region;
the vibration module comprises:
a first vibration element on the first rear region of the display module; and
a second vibration element on the second rear region of the display module; and
the plurality of communication holes is arranged along a periphery of the vibration plate.

9. The display apparatus of claim 8, wherein each of the first vibration element and the second vibration element comprises a piezoelectric material layer.

10. The display apparatus of claim 8, further comprising:
a respective buffering member near each of the first vibration element and the second vibration element,
wherein a height of the buffering member is greater than a height of each of the first vibration element and the second vibration element with respect to a front surface of the vibration plate.

11. The display apparatus of claim 8, wherein the communication part further comprises a plurality of middle communication holes between the first vibration element and the second vibration element along the second lateral direction of the display module.

12. The display apparatus of claim 11, wherein the communication part further comprises a plurality of peripheral communication holes surrounding the vibration module.

13. The display apparatus of claim 1, wherein:
the vibration plate is on a rear surface of the display panel using a plate securing member, and
the plate securing member is configured to provide the first air gap between the rear surface of the display panel and the vibration plate.

14. The display apparatus of claim 1, wherein the system rear cover comprises:
a bottom structure covering the rear surface of the vibration plate;
a sidewall structure surrounding a side surface of the display module; and
a border gap between the sidewall structure and the side surface of the display module, the border gap being configured to output sound.

15. The display apparatus of claim 14, wherein:
the system rear cover further comprises a rear sound guide member protruding from a corner of the bottom structure and the sidewall structure; and
the rear sound guide member has a curved surface facing the second air gap and the border gap.

16. The display apparatus of claim 14, further comprising a system front cover covering a periphery of the front surface of the display module and the border gap, the system front cover comprising at least one sound output part overlapping the border gap.

17. The display apparatus of claim 1, wherein the vibration plate comprises one or more of: an aluminum (Al) material, a magnesium (Mg) material, an Al alloy material, a Mg alloy material, and a Mg-lithium (Li) alloy material.

18. The display apparatus of claim 1, wherein the vibration plate has a thickness of 0.1 mm to 2.0 mm.

19. The display apparatus of claim 1, wherein the display module comprises:
a printed circuit board connected to the display panel;
a user connector on the printed circuit board;
a sound output connector connected to the vibration module; and
an audio amplifier in the printed circuit board, the audio amplifier being configured to:
amplify a sound signal input through the user connector to generate a sound driving signal; and
output the generated sound driving signal to the sound output connector.

20. A computing apparatus, comprising:
a system body;
a display apparatus comprising:
a display module comprising a display panel configured to display an image;
a vibration plate on a rear surface of the display module;
a first air gap between the vibration plate and the rear surface of the display module;
a vibration module on the vibration plate; and
a system rear cover on a rear surface of the vibration plate;
a second air gap between the system rear cover and the rear surface of the vibration plate,
wherein the vibration plate comprises a communication part configured to allow air to flow between the first air gap and the second air gap, and
wherein the communication part comprises:
a plurality of first communication holes through the vibration plate and arranged along a first lateral direction of the display module, and
a plurality of second communication holes arranged along a second lateral direction of the display module, the second lateral direction being perpendicular to the first lateral direction; and
a hinge part between the system body and the display apparatus, the hinge part being configured to rotatably support the display apparatus.

21. The computing apparatus of claim 20, wherein the display module comprises:
a printed circuit board connected to the display panel;
a user connector on the printed circuit board, the user connector being configured to receive a sound signal input from the system body;
a sound output connector on the printed circuit board, the sound output connector being connected to the vibration module; and
an audio amplifier on the printed circuit board, the audio amplifier being configured to:
amplify the sound signal input through the user connector to generate a sound driving signal; and
output the generated sound driving signal to the sound output connector.

22. The computing apparatus of claim 20, wherein:
the system body comprises a main board comprising:
- a sound processing circuit configured to generate a sound signal; and
- an audio amplifier configured to amplify the sound signal to generate a sound driving signal; and the display module comprises:
- a printed circuit board connected to the display panel;
- a user connector on the printed circuit board, the user connector being configured to receive the sound driving signal input from the system body; and
- a sound output connector connected to the vibration module, the sound output connector being configured to output the sound driving signal, input through the user connector, to the vibration module.

23. The computing apparatus of claim 20, wherein the communication part further comprises a plurality of peripheral communication holes surrounding the vibration module.

24. The computing apparatus of claim 20, wherein:
the display module comprises:
- a first rear region; and
- a second rear region; and the vibration module comprises:
- a first vibration element on the first rear region of the display module; and
- a second vibration element on the second rear region of the display module.

25. The computing apparatus of claim 24, wherein the communication part further comprises a middle communication hole through the vibration plate between the first vibration element and the second vibration element.

26. The computing apparatus of claim 20, wherein:
the display module comprises:
- a panel guide configured to support the display panel; and
- a supporting cover configured to accommodate the panel guide;

the vibration plate is on a rear surface of the supporting cover;

the supporting cover comprises a cover plate comprising an opening overlapping a portion other than a periphery of the display panel; and the vibration plate is connected to the cover plate and is configured to cover the opening of the supporting cover.

27. The computing apparatus of claim 20, wherein the system rear cover comprises:
- a bottom structure covering the rear surface of the vibration plate;
- a sidewall structure surrounding a side surface of the display module; and
- a border gap between the sidewall structure and the side surface of the display module so as to output sound.

* * * * *